US009785236B2

(12) United States Patent
Afshar

(10) Patent No.: US 9,785,236 B2
(45) Date of Patent: Oct. 10, 2017

(54) HAPTIC INTERFACE FOR PORTABLE ELECTRONIC DEVICE

(71) Applicant: Immerz, Inc., Cambridge, MA (US)

(72) Inventor: Shahriar S. Afshar, Boston, MA (US)

(73) Assignee: Immerz, Inc., Cambridge, MA (US)

( * ) Notice: Subject to any disclaimer, the term of this patent is extended or adjusted under 35 U.S.C. 154(b) by 0 days.

(21) Appl. No.: 13/903,443

(22) Filed: May 28, 2013

(65) Prior Publication Data

US 2013/0318438 A1 Nov. 28, 2013

Related U.S. Application Data

(60) Provisional application No. 61/651,916, filed on May 25, 2012, provisional application No. 61/748,898, filed on Jan. 4, 2013, provisional application No. 61/759,243, filed on Jan. 31, 2013.

(51) Int. Cl.
 *G06F 3/01* (2006.01)
 *G06F 1/16* (2006.01)
 *G06F 3/0488* (2013.01)

(52) U.S. Cl.
 CPC ............ *G06F 3/016* (2013.01); *G06F 1/1626* (2013.01); *G06F 1/1632* (2013.01); *G06F 3/04886* (2013.01); *G06F 2203/014* (2013.01)

(58) Field of Classification Search
 CPC ...................................... G06F 3/016
 USPC .......................... 345/156; 715/702
 See application file for complete search history.

(56) References Cited

U.S. PATENT DOCUMENTS

| 3,074,504 A | 1/1963 | Trautman |
| 4,131,180 A | 12/1978 | Maeda |
| 4,482,026 A | 11/1984 | Stehlin, Jr. |
| 5,054,011 A | 10/1991 | Alves |
| 5,528,697 A | 6/1996 | Saito |

(Continued)

FOREIGN PATENT DOCUMENTS

| EP | 2383631 A1 | 11/2011 |
| JP | 10093672 | 4/1998 |

(Continued)

OTHER PUBLICATIONS

International Search Report and Written Opinion for PCT/US2013/42876 dated Feb. 6, 2014.

(Continued)

*Primary Examiner* — William Titcomb

(57) ABSTRACT

The application includes an apparatus connectable with a portable electronic and/or consumer electronics device that provides haptic information and/or feedback to a user of the portable electronic device. The apparatus may include one or more acousto-haptic transducers that provide at least one of audio and haptic output to a user of the portable electronic device. Systems and methods also provide a vibrating membrane or waveguide that transfers haptic or vibrational feedback to a user that touches the membrane using, for example, their finger. The membrane may be transparent, allowing the membrane to be overlaid over a touch screen, keypad, and/or keyboard to provide haptic feedback to a user as the user types on the touch screen. In this way, a user can continue to view the touch screen or display of a media device while experiencing haptic sensations from the vibrating membrane.

9 Claims, 28 Drawing Sheets

(56) References Cited

U.S. PATENT DOCUMENTS

| | | | |
|---|---|---|---|
| 5,629,501 A | 5/1997 | Fenton | |
| 6,563,934 B1 | 5/2003 | Swope et al. | |
| 6,839,444 B2 | 1/2005 | Ellis et al. | |
| 8,339,250 B2* | 12/2012 | Je et al. | 340/407.2 |
| 8,878,655 B2* | 11/2014 | Sormunen | G06F 3/016 |
| | | | 340/12.54 |
| 8,902,159 B1* | 12/2014 | Matthews et al. | 345/156 |
| 8,981,682 B2* | 3/2015 | Delson | A63F 13/06 |
| | | | 318/114 |
| 2007/0038164 A1 | 2/2007 | Afshar | |
| 2007/0097073 A1 | 5/2007 | Takashima et al. | |
| 2008/0100588 A1* | 5/2008 | Nogami et al. | 345/173 |
| 2008/0296072 A1* | 12/2008 | Takashima et al. | 178/18.01 |
| 2009/0154737 A1 | 6/2009 | Ostler et al. | |
| 2010/0079264 A1 | 4/2010 | Hoellwarth | |
| 2010/0079379 A1 | 4/2010 | Demuynck et al. | |
| 2010/0238116 A1 | 9/2010 | Shin | |
| 2010/0260371 A1* | 10/2010 | Afshar | H04R 7/24 |
| | | | 381/394 |
| 2010/0283727 A1* | 11/2010 | Jiang | G06F 3/017 |
| | | | 345/156 |
| 2011/0227841 A1 | 9/2011 | Argiro | |
| 2011/0234494 A1 | 9/2011 | Peterson et al. | |
| 2012/0028577 A1* | 2/2012 | Rodriguez et al. | 455/41.1 |
| 2012/0033375 A1 | 2/2012 | Madonna et al. | |
| 2012/0051557 A1* | 3/2012 | Horigome et al. | 381/86 |
| 2012/0096637 A1 | 4/2012 | Laflamme et al. | |
| 2012/0126664 A1* | 5/2012 | Ogura et al. | 310/312 |
| 2012/0154340 A1 | 6/2012 | Vuppu et al. | |
| 2012/0286944 A1* | 11/2012 | Forutanpour | G06F 3/04847 |
| | | | 340/407.1 |
| 2012/0299853 A1* | 11/2012 | Dagar | 345/173 |
| 2012/0306631 A1* | 12/2012 | Hughes | H04M 19/047 |
| | | | 340/407.1 |
| 2012/0326982 A1* | 12/2012 | Pasquero | G06F 3/016 |
| | | | 345/161 |
| 2013/0038792 A1* | 2/2013 | Quigley | A61H 19/00 |
| | | | 348/515 |
| 2013/0058021 A1* | 3/2013 | Numata | 361/679.01 |
| 2013/0156219 A1* | 6/2013 | Proebstel | H04R 1/2803 |
| | | | 381/91 |
| 2013/0202134 A1* | 8/2013 | Afshar | H04R 1/22 |
| | | | 381/151 |
| 2013/0335209 A1* | 12/2013 | Cruz-Hernandez | G08B 6/00 |
| | | | 340/407.1 |
| 2014/0073409 A1* | 3/2014 | Lesley | A63F 13/06 |
| | | | 463/25 |
| 2014/0082654 A1* | 3/2014 | van Coppenolle et al. | 725/25 |
| 2014/0111912 A1* | 4/2014 | Gobeil | 361/679.01 |
| 2014/0120860 A1* | 5/2014 | Amis | G08B 25/005 |
| | | | 455/404.1 |
| 2014/0120872 A1* | 5/2014 | Amis | H04W 12/00 |
| | | | 455/411 |
| 2014/0176415 A1* | 6/2014 | Buuck | G06F 3/016 |
| | | | 345/156 |
| 2014/0198069 A1* | 7/2014 | Park et al. | 345/173 |
| 2014/0281954 A1* | 9/2014 | Ullrich | G06F 15/0291 |
| | | | 715/702 |

FOREIGN PATENT DOCUMENTS

| | | |
|---|---|---|
| WO | WO-02093976 | 11/2002 |
| WO | WO-2009051976 | 4/2009 |
| WO | WO-2010118313 | 10/2010 |
| WO | WO-2012025783 A1 | 3/2012 |
| WO | WO-2013052883 | 4/2013 |
| WO | WO-2014031756 | 2/2014 |

OTHER PUBLICATIONS

European Search Report, Application No. 13793530.0 dated Mar. 12, 2015.
International Search Report and Written Opinion for PCT/US2010/030533 mailing date Oct. 20, 2011.
International Search Report and Written Opinion for PCT/US/2013/56001 mailing date Mar. 10, 2014.
International Search Report and Written Opinion for PCT/US2012/059080 mailing date Dec. 26, 2012.
European Search Report for Application No. 12838657.0 mailing date May 4, 2016.

* cited by examiner

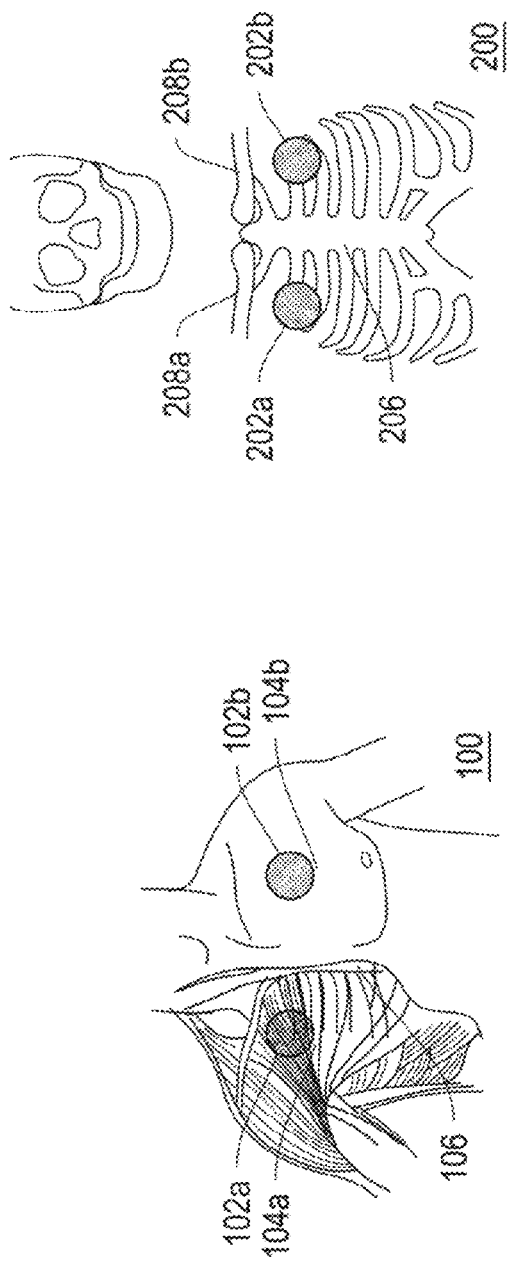
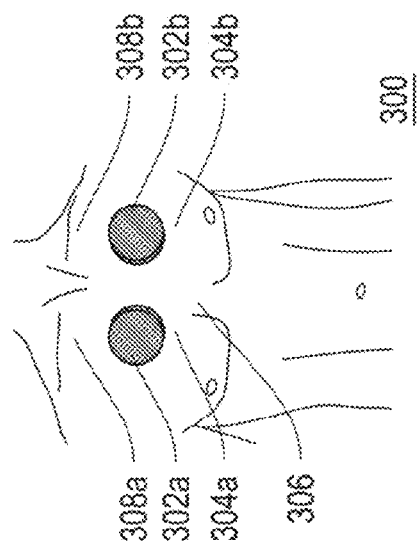

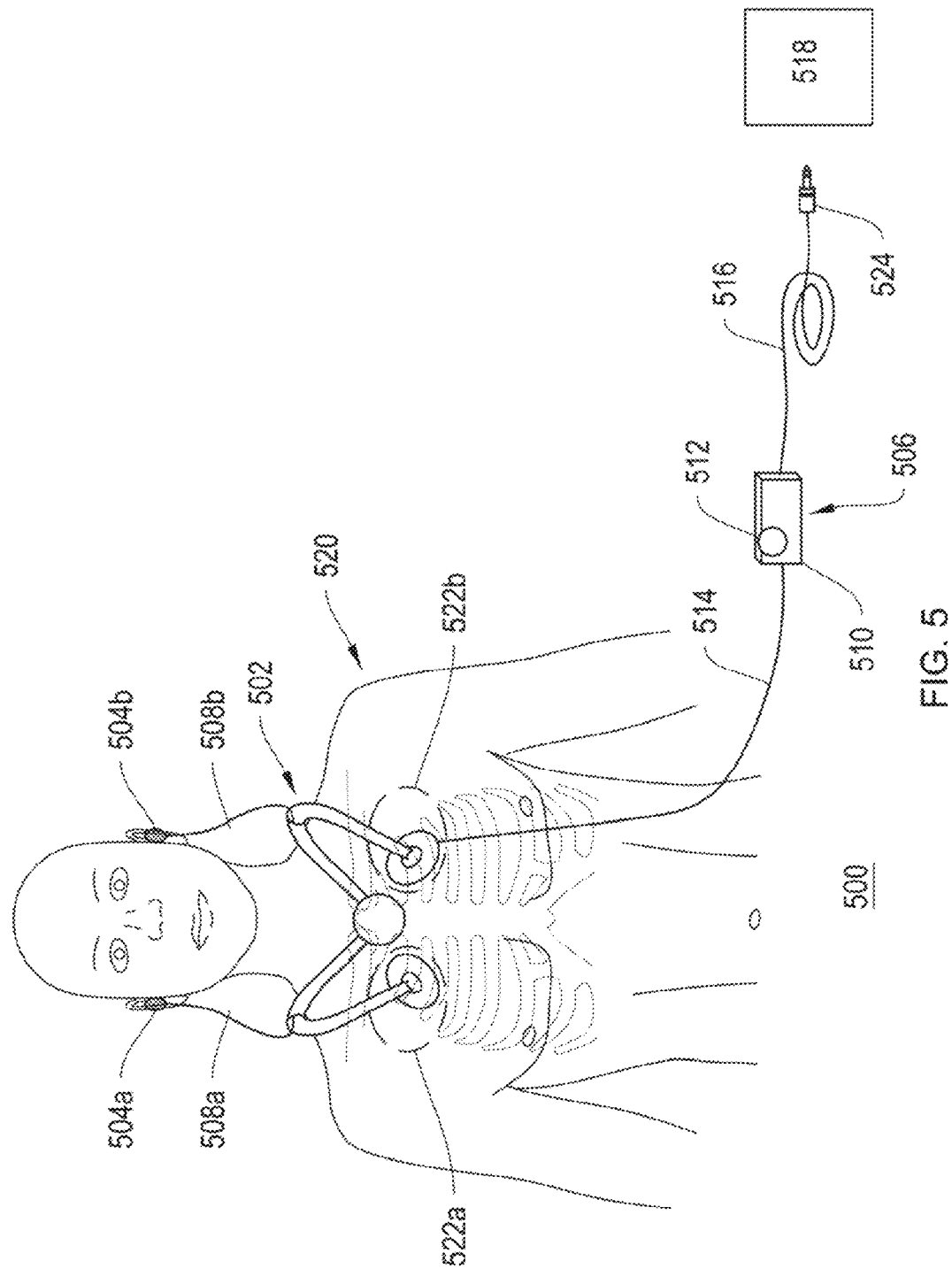

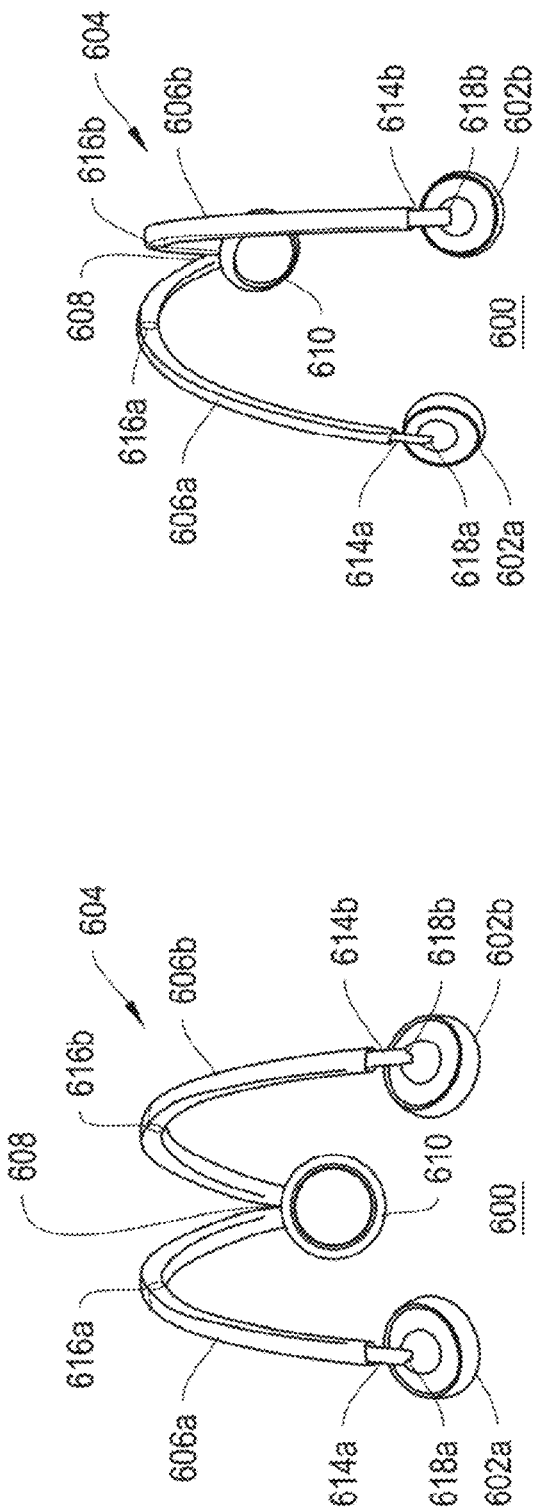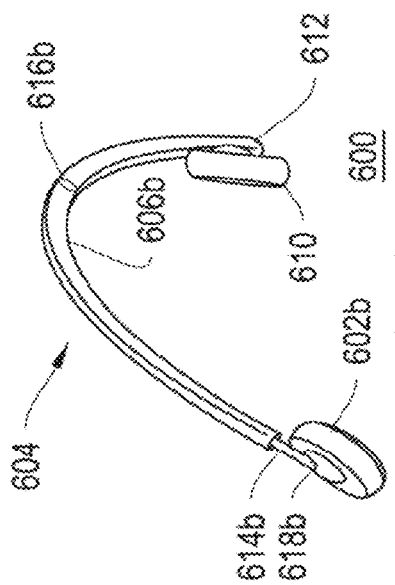

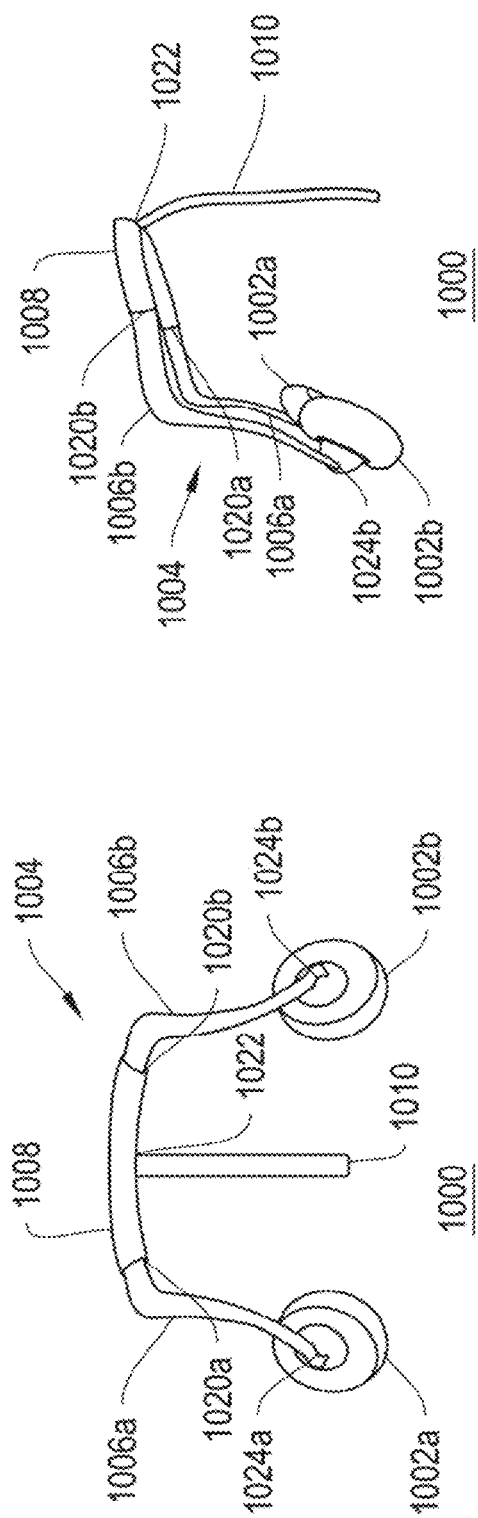
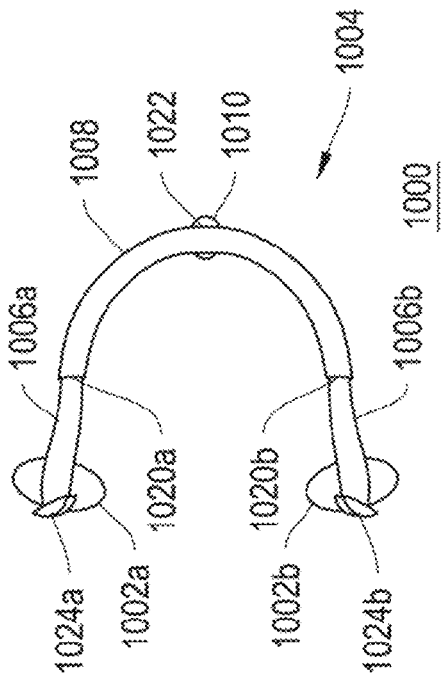
FIG. 10A
FIG. 10B
FIG. 10C

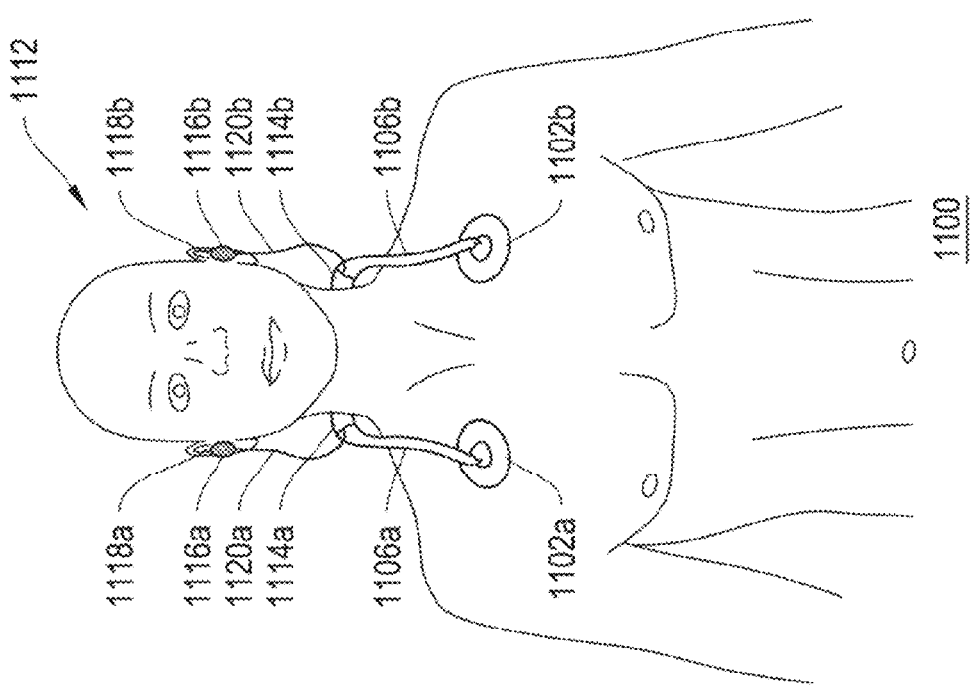

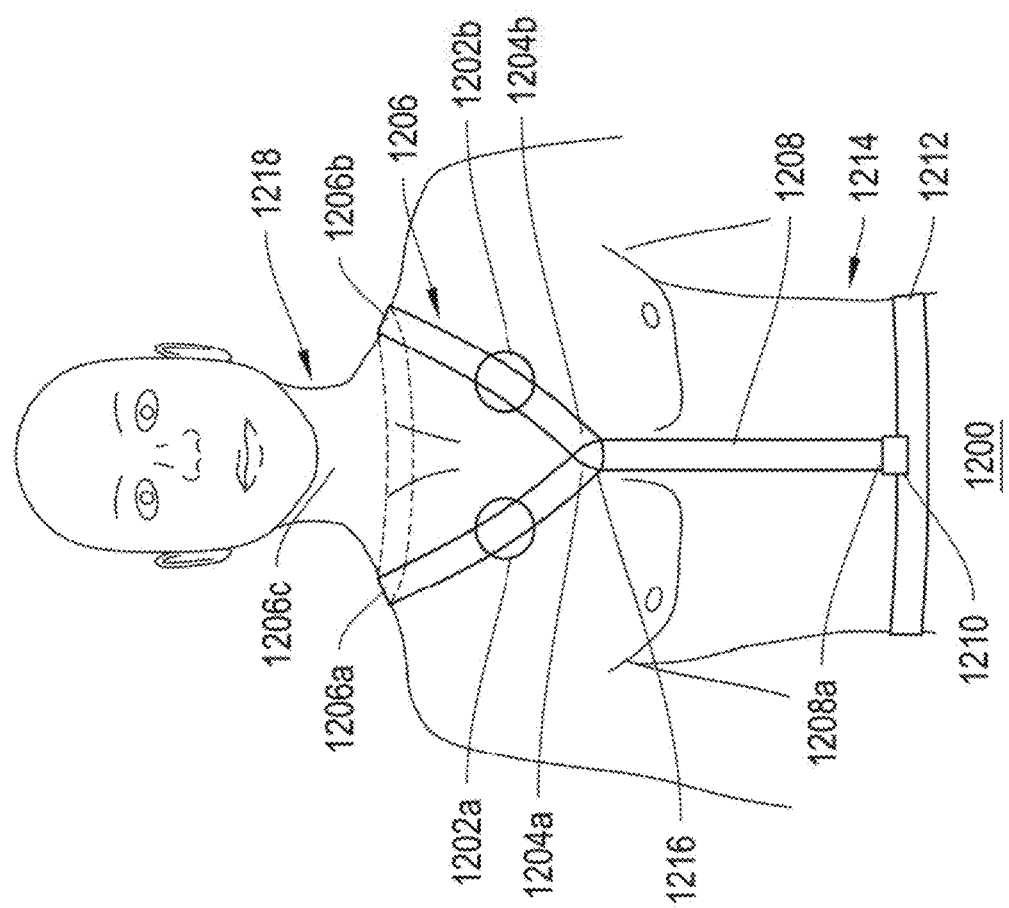

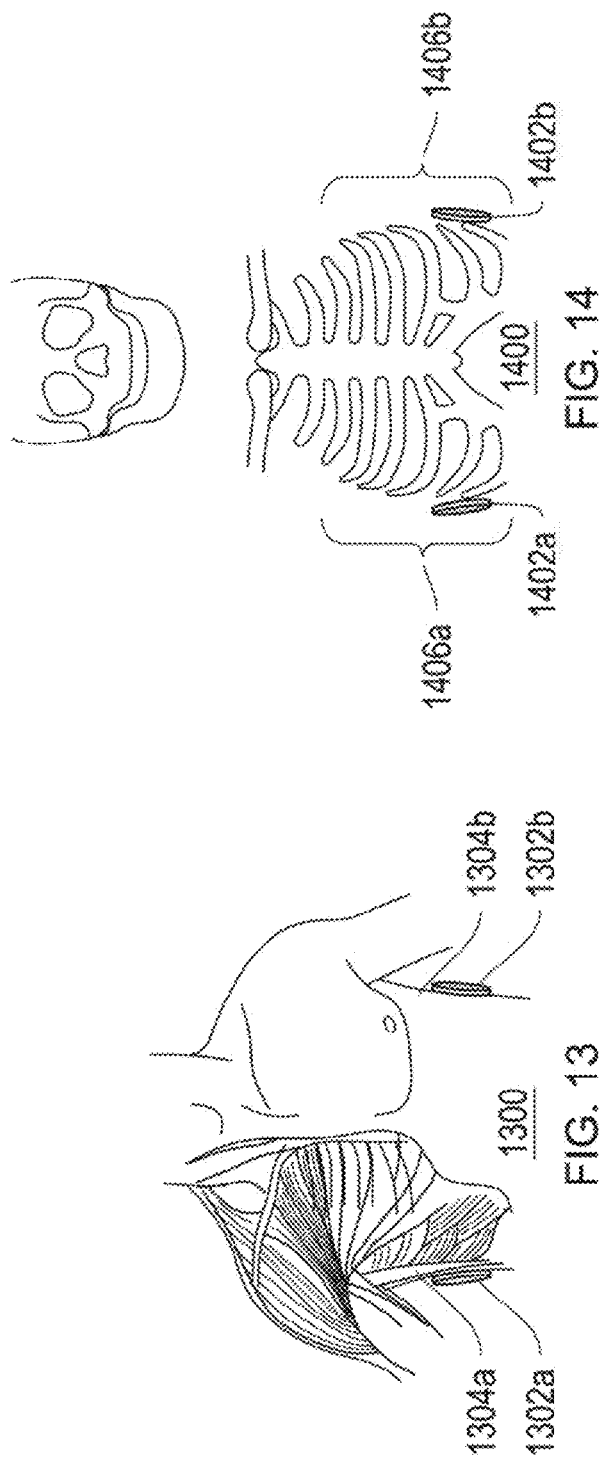
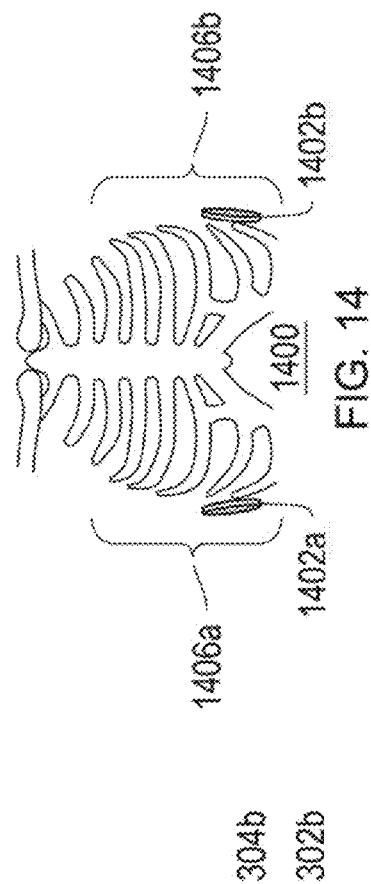
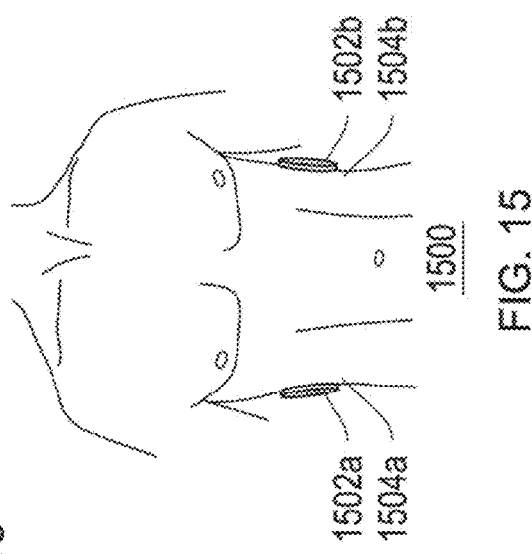

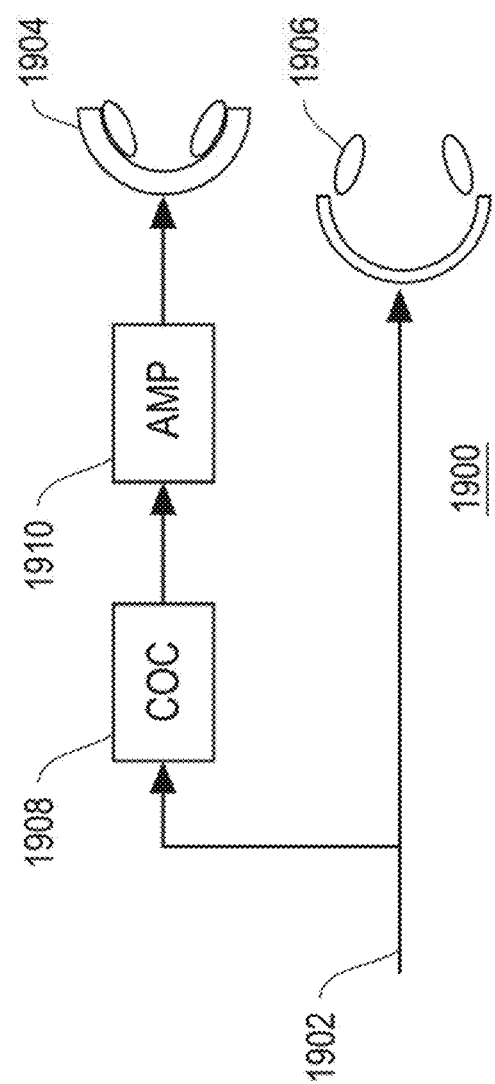

2300

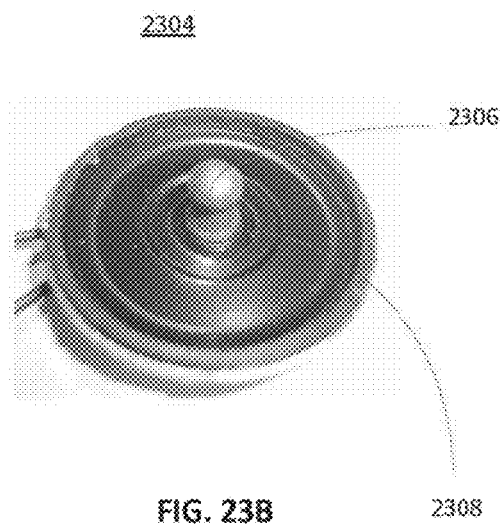
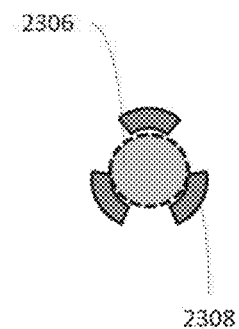
FIG. 23B
FIG. 23C

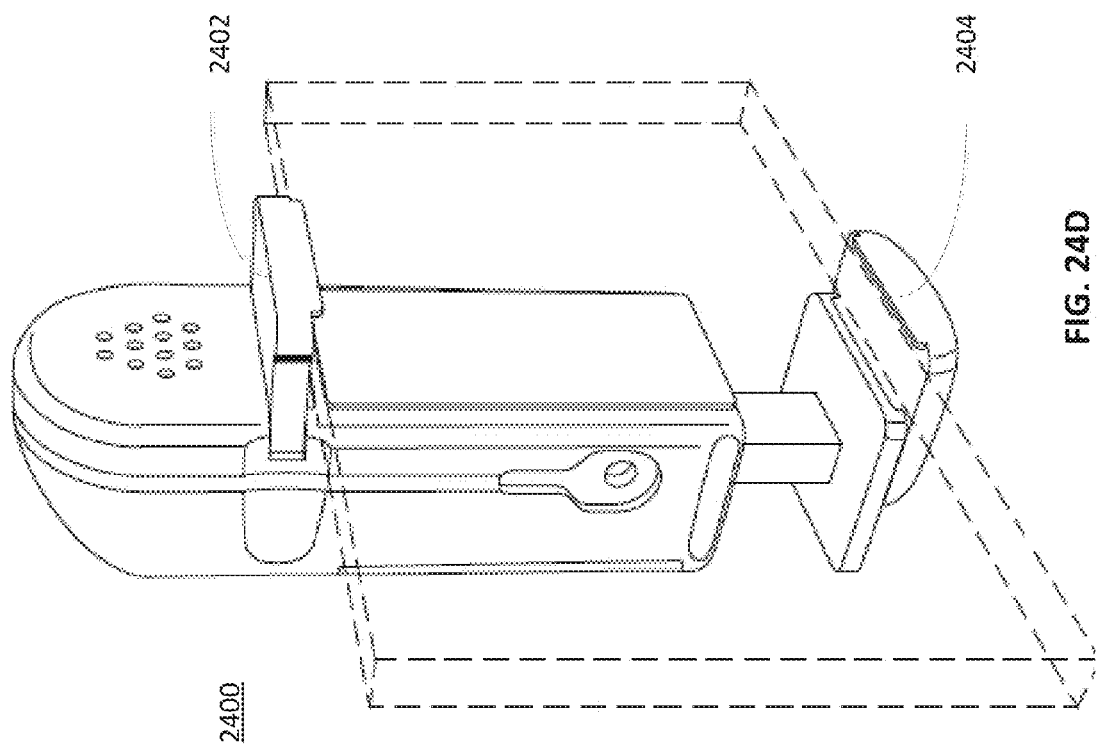

HAPTIC INTERFACE FOR PORTABLE ELECTRONIC DEVICE

CROSS-REFERENCE TO RELATED APPLICATIONS

This application claims the benefit of U.S. Provisional Application No. 61/651,916, filed May 25, 2012, U.S. Provisional Application No. 61/748,898, filed Jan. 4, 2013, and U.S. Provisional Application No. 61/759,243, filed Jan. 31, 2013, the contents of each of which are incorporated by reference herein in their entirety.

BACKGROUND

Today there are many multimedia systems that present audio and visual data to a user. As devices decrease in size and become more portable, screen size and sound quality decrease as well, adversely affecting the user's interaction with the data being presented. Existing methods for supplementing a user's experience have drawbacks which compromise the user's comfort and perception of the content being presented. For example, audio speakers intended for individual use, such as those found in headphones, are either too small to generate sound over a wide frequency range or so large as to be uncomfortable and cumbersome. Other devices attempt to compensate for speakers that are unable to generate low frequency sound by applying vibrations to the user. Many of these devices are uncomfortable or distracting to use, especially after prolonged use. For example, some devices apply vibrations to the head of the user, which can cause headaches, or to a location on the posterior side of the user, which unintentionally gives the impression the sound originates from behind the user. Furthermore, home theatre or personalized vibrating chair surround sound systems with large woofers are prohibitively expensive; and since the low frequency sound easily penetrates walls, the bass component of the sound is usually bothersome to user's neighbors, thus rendering the systems unsuitable for apartment complexes.

A need exists for systems and methods that improve the user's interaction with the content being presented. It is desirable that the system does not distract from the content being presented. It is also desirable that the system be easy to use, portable, inexpensive, and suitable for long term use.

There is also a need to provide vibrational and audio feedback to user of media device that have, for example, a touch screen which gives a user sensations similar to tradition keyboards and/or keypads.

SUMMARY

The application includes an apparatus connectable with a portable electronic and/or consumer electronics device that provides haptic information and/or feedback to a user of the portable electronic device. The apparatus may also function as a partial housing for a portable electronic device. The apparatus may include an electrical and/or mechanical connection with a portable electronic device to enable to the exchange of electronic data between the apparatus and portable electronic device. The apparatus may include one or more transducers that provide at least one of audio and haptic output to a user of the portable electronic device. The haptic and/or audio information may be associated with media being displayed, played, and/or stored on the portable electronic device. The apparatus housing may include a hard case having a relatively low mass to enhance the propagation of haptic information (e.g., vibrations). A user may interface with the apparatus via one or both hands. The apparatus may be segregated into a plurality of physical regions where each region is associated with a vibration unit providing certain haptic information.

The docking apparatus may be arranged in any number of dimensions so as to releasably hold a portable electronic device. A portable electronic device may include a cellular telephone, portable computer, tablet computer, personal digital assistant (PDA), portable electronic game device, a consumer electronic device, and/or a hand-held electronic device. The docking apparatus may also be referred to as a skin, shell, case, and/or cover for a media device such as a mobile phone.

In another aspect, the systems and methods includes an apparatus comprising a user interface including a keyboard, and a vibrating membrane overlaid onto the keyboard and arranged to provide haptic sensations to a user while interfacing with the user interface. The vibrating membrane may be substantially transparent and may include at least one waveguide. In certain embodiments, the keyboard includes a virtual keyboard displayed on a touchscreen display. The apparatus may include a processor and a datastore. The datastore may be arranged to store one or more haptic or audio files. The processor may be arranged to receive input from the vibrating membrane indicating contact with a user and, in response, retrieving a file from the datastore to send to a vibration source coupled to the vibrating membrane. In certain embodiments, the vibrating source converts the electronic data of the file to an acoustic and/or haptic signal emitted from the vibrating membrane.

Also, disclosed herein are systems and methods for applying vibration to the body of a user to enhance the user's interaction with and perception of content being presented. Locations on the body for receiving vibrations are disclosed along with characteristics of locations. Illustrative embodiments of vibration systems are described, including vibrators for converting data to vibration and support structures for supporting and positioning the vibrators. Other devices that may be used in conjunction with the vibrators are described, including audio speakers, signal processors and media devices.

In one aspect of the disclosure, a vibration system comprises a vibrator capable of converting an electrical signal into vibration. The vibrator can be arranged on or about a human body on a pectoralis major muscle and spaced away from the sternum. The vibration system can include at least one of a support structure for arranging the vibrator, an audio speaker for generating sound, and a video display for generating a visual image.

The vibration system can include a second vibrator arranged on or about the body on a pectoralis major muscle and spaced away from the sternum. In one configuration, the support structure disposes the vibrators on a front-back coronal plane of the body and symmetrically across a left-right median plane of the body.

In one implementation of the disclosure, the support structure includes at least one curved harness, with each harness adapted to fit over a shoulder of the body. Each harness can have two ends configured to flex inwardly toward each other to push a vibrator against the body. The support structure can include an adjustable endpiece that is nested within a free end of each curved harness and is capable of sliding in and out of the free end. Each curved harness can have a harness joint within its midsection that is adapted to allow a free end of each curved harness to fold towards a point of attachment of two curved harnesses. A vibrator joint can join the vibrator to a free end of a curved harness. The vibrator joint can be adapted to adjust an angle between the vibrator and the free end. A vibrator can be positioned at a point of attachment of two curved harnesses and be adapted to convert a rear channel electrical audio signal of a surround sound system into a vibration.

In another implementation of the disclosure, the support structure includes a bent element that is adapted to fit on a front of a shoulder of the body and has an end adapted to attach to the vibrator. A vibrator joint can join the vibrator to the bent element and be adapted to adjust an angle between the vibrator and the bent element. The support structure can include a semi-circular element that is adapted to fit around the back of the neck of the body and has two ends each adapted to attach to a bent element. A bent element joint can join a bent element to the semi-circular element and be adapted to fold the bent element and the semi-circular element together in a common plane. The support structure can include a long element vertically centered on an upper back of the body, attached to a midpoint of the semi-circular element at an angle adapted to push a vibrator against the body. A midpoint joint can join the long element to the semi-circular element and be adapted to fold the two elements together in a common plane.

In another implementation of the disclosure, the support structure includes a stretchable band adapted to fit over a shoulder and fastener means adapted to fasten the stretchable band to a waistband.

The vibration system can feature at least one of a pitch controller, a volume controller, a fade-in device, an amplitude-ceiling device, and a bass-enhancement device. The pitch controller can modulate a pitch characteristic of an electrical signal. The volume controller can raise and lower an amplitude characteristic of an electrical signal. The fade-in device can gradually raise an amplitude characteristic of an electrical signal. The amplitude-ceiling device can impose an upper limit on an amplitude characteristic of an electrical signal. The bass-enhancement device can sample a first electrical signal to create a sampled signal, modulate a pitch characteristic of the sampled signal to create a modulated sampled signal, and mix the modulated sampled signal with the first electrical signal. The vibration system can also feature a signal processing device capable of detecting that no electrical signal has been received for a preset amount of time, a power supply for powering a signal processing device, and an automatic shut-off device that can turn off the signal processing device in response to the signal processing device detecting that no electrical signal is being received for the preset amount of time. The vibration system can also feature a low frequency cross-over circuit capable of filtering through low frequency sound from an electrical signal and an amplifier capable of amplifying the electrical signal.

In another implementation of the disclosure, the vibrator includes at least one of an inertial transducer, an off-balance rotor, a tactile transducer, or a piezoelectric transducer. A surface of the vibrator can be made of at least one of synthetic rubber, foam cushion, polyurethane, speaker cover fabric, or silicone. A surface of the support structure can be made of at least one of synthetic rubber or speaker cover fabric.

In another aspect of the disclosure, a vibration system includes a vibrator capable of converting an electrical signal into a vibration and a support structure for arranging the vibrator. The support structure can arrange the vibrator at a location on or about a human body such that a first pattern of vibrations are generated on the body's surface, where the first pattern matches in relative amplitude a second pattern of surface vibrations generated when the body generates sound. The vibration system can include at least one of an audio speaker for generating sound and a video display for generating a visual image. The support structure can dispose a plurality of vibrators on a front-back coronal plane of the body and symmetrically across a left-right median plane of the body. The vibrator can be arranged on or about a side of a torso of the body. In one implementation of the disclosure, the support structure includes a stretchable band adapted to encircle a torso of the body.

BRIEF DESCRIPTION OF THE DRAWINGS

The foregoing and other objects and advantages of the disclosure will be appreciated more fully from the following further description thereof, with reference to the accompanying drawings wherein:

FIG. 1 depicts a front view of vibrator locations with respect to the body's underlying musculature;

FIG. 2 depicts a front view of vibrator locations with respect to the body's underlying skeletal system;

FIG. 3 depicts a front view of vibrator locations with respect to the body's external surface;

FIG. 5 depicts a front view of an exemplary vibration system for experiencing audio and haptic data;

FIGS. 6A, 6B, and 6C depict, respectively, a front view, an oblique view, and a side view of an exemplary vibration device for applying vibrations to the user and capable of being used in the vibration system of FIG. 5;

FIGS. 10A, 10B, and 10C depict, respectively, a front view, a side view, and a top view of an exemplary vibration device for applying vibrations to the user and capable of being used in the vibration system of FIG. 9;

FIG. 11 depicts a front view of an exemplary vibration device and exemplary audio speakers being applied to the user and capable of being used in the vibration system of FIG. 9;

FIG. 12 depicts, a front view and of an exemplary vibration device for applying vibrations to the user;

FIG. 13 depicts a front view of vibrator locations with respect to the body's underlying musculature;

FIG. 14 depicts a front view of vibrator locations with respect to the body's underlying skeletal system;

FIG. 15 depicts a front view of vibrator locations with respect to the body's external surface;

FIG. 19 depicts an exemplary block diagram of processing circuitry that can be used in a vibration system.

FIGS. 23A-23C depict exemplary vibration devices having mass elements for experiencing audio and haptic data.

FIGS. 24A-24D depict various closed and open views of an exemplary acousto-haptic apparatus for use with a portable electronic device.

DESCRIPTION OF ILLUSTRATED EMBODIMENTS

To provide an overall understanding of the disclosure, certain illustrative embodiments will now be described.

Figure 4B:
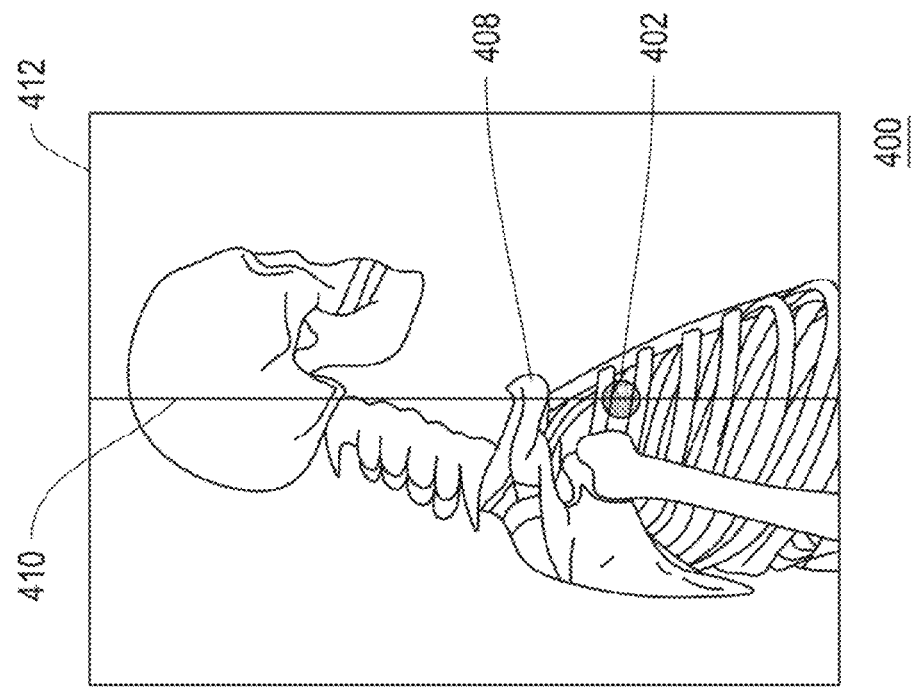
FIGS. 4A and 4B depict, respectively, an oblique view and a side view of vibrator locations with respect to the body's anatomical planes.

Turning to FIGS. 1-4B, there are depicted vibrator location arrangements 100, 200, 300, and 400 on a human body. In particular, FIG. 1 depicts vibrator locations 102a and 102b with respect to the body's underlying musculature. FIG. 2 depicts vibrator locations 202a and 202b with respect to the body's underlying skeletal system. FIG. 3 depicts vibrator locations 302a and 302b with respect to the body's external surface. FIGS. 4A and 4B depict, respectively, an oblique view and a side view of vibrator location 402 with respect to the body's anatomical planes.

As depicted by FIG. 1, vibrator location arrangement 100 has vibrator locations 102a and 102b disposed symmetrically across the chest of the body. A first vibrator location 102a is located adjacent to a first pectoralis major muscle 104a, and similarly a second vibrator location 102b is located adjacent to a second pectoralis major muscle 104b. Both vibrator locations 102a and 102b are spaced away from the sternum 106.

As depicted by FIG. 2, vibrator location arrangement 200 has vibrator locations 202a and 202b disposed symmetrically across the chest of the body. A first vibrator location 202a is located inferior to a first clavicle bone 208a, and similarly a second vibrator location 202b is located inferior to a second clavicle bone 208b. Both vibrator locations 202a and 202b are spaced away from the sternum 206.

As depicted by FIG. 3, vibrator location arrangement 300 has vibrator locations 302a and 302b disposed symmetrically across a chest of the body. A first vibrator location 302a is located adjacent to a first pectoralis major muscle 304a and inferior to a first clavicle bone 308a; and similarly a second vibrator location 302b is located adjacent to a second pectoralis major muscle 304b and inferior to a second clavicle bone 308b. Both vibrator locations 302a and 302b are spaced away from a sternum 306.

Figure 4A:
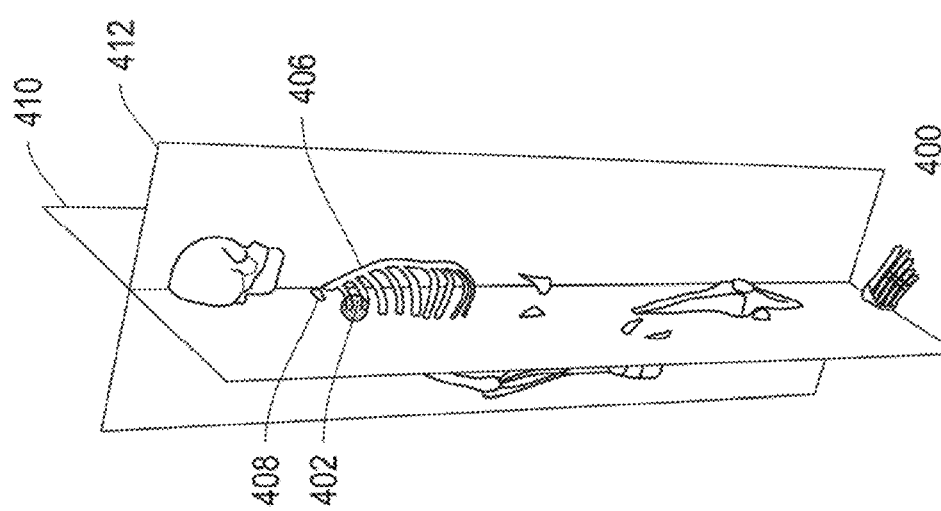

As depicted by FIGS. 4A and 4B, vibrator location arrangement 400 includes vibrator location 402 disposed on a front-back coronal plane 410 of the body, inferior to a clavicle bone 408, and spaced away from a sternum 406. Vibrator location arrangements can also be symmetric across the left-right median plane 412. In particular, a second vibrator location can be disposed opposite vibrator location 402 such that the two locations are symmetric with respect to the left-right median plane 412.

FIG. 5 depicts an exemplary vibration system 500 for experiencing audio and haptic data. The vibration system 500 is depicted on a human body 520 having vibrator locations 522a and 522b. The vibration system 500 includes a vibration device 502, optional audio speakers 504a and 504b, and a processor 506. The vibration device 502 is described below in reference to FIGS. 6A-8. The optional audio speakers 504a and 504b can be any suitable audio device, such as an earphone, headphone, or neckphone, and can be attached by wires 508a and 508b to the vibration device 502. Alternatively, the audio speakers can be separate from the vibration device 502 or the user can opt to not have or use audio speakers in conjunction with the vibration device 502.

The depicted processor 506 includes a housing 510 that encases the processing circuitry, such as the processing circuitry described below in reference to FIG. 19, and supports user control interfaces such as a button, switch, or dial 512. The housing 510 can attach by wire 514 to the vibration device 502 and by wire 516 to any suitable data source 518 of audio or haptic data, such as a portable music device or video game console. The wires 514 and 516 may each have an audio jack, such as the audio jack 524 attached to the end of the wire 516, for connecting to, respectively, the processor 506 and the data source 518. Alternatively, the vibration device 502 can attach directly to a data source 518. In another alternative embodiment, the vibration device 502, the processor 506, and the data source 518 can include, respectively, a wireless receiver, a wireless transceiver, and a wireless transmitter for communicating audio or haptic data.

FIGS. 6A-8 depict in more detail an illustrative embodiment of the vibration device 502. In particular, FIGS. 6A-6C depict, respectively, a front view, an oblique view, and a side view of an exemplary vibration device 600 having two vibrators 602a and 602b positioned by a support structure 604. The vibrators 602a and 602b, described below in reference to FIG. 8, can include any suitable mechanism capable of transforming an electrical signal into vibration, such as a transducer or an off-balance rotor. The vibrators 602a and 602b attach to a support structure 604 that includes two curved harnesses 606a and 606b joined at a point of attachment 608. In particular, the vibrators 602a and 602b can attach to ends of the curved harnesses 606a and 606b, or alternatively to adjustable endpieces 614a and 614b nested within the ends of the curved harnesses 606a and 606b, via vibrator joints 618a and 618b. The curved harnesses 606a and 606b can have harness joints, respectively 616a and 616b. The point of attachment 608 can have an additional rear vibrator 610 or, alternatively, a rear cushion. The point of attachment 608 can also have an adductor joint 612.

Figure 7:
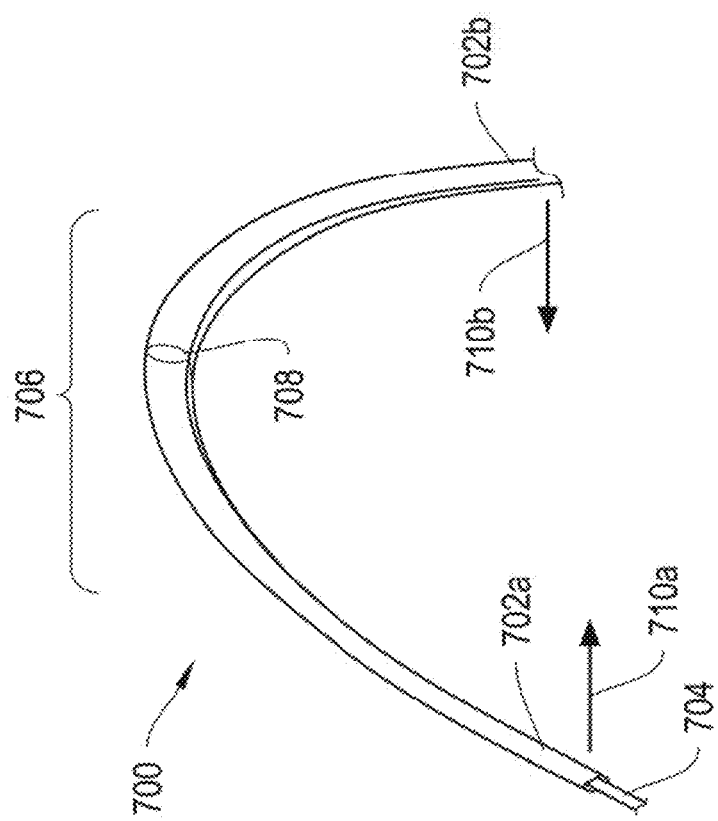
FIG. 7 depicts a side view of an exemplary harness and an exemplary adjustable endpiece both capable of being used in the vibration devices of FIGS. 5-6C.

FIG. 7 depicts an exemplary curved harness 700 and adjustable endpiece 704 that can be used in the support structure 604. The curved harness 700 has two ends 702a and 702b configured to flex inwardly toward each other, as indicated by arrows 710a and 710b. The end 702a has an adjustable endpiece 704 nested within the curved harness 700. The adjustable endpiece 704 is capable of sliding in and out of the curved harness 700 to adjust a length of the curved harness 700. Between the ends 702a and 702b is a harness midsection 706, which can include a harness joint 708. The curved harness 700 and the adjustable endpiece 704 can be made of any suitably light, tensile material such as plastic, include padding such as fabric padding along their surfaces that are adjacent to the user to provide a more comfortable fit, and have external surfaces sufficiently tacky to prevent slippage when the surface rests against skin or fabrics typically used in clothing. Examples of suitable materials for their external surfaces include synthetic rubber and fabric used to cover audio speakers. The curved harness 700 can be between 10 inches and 13 inches in length and ¼ inches and 1 inch in width, while the adjustable endpiece 704 can be between 2 inches and 4 inches in length and ⅛ inches and ¾ inches in width.

Figure 8:
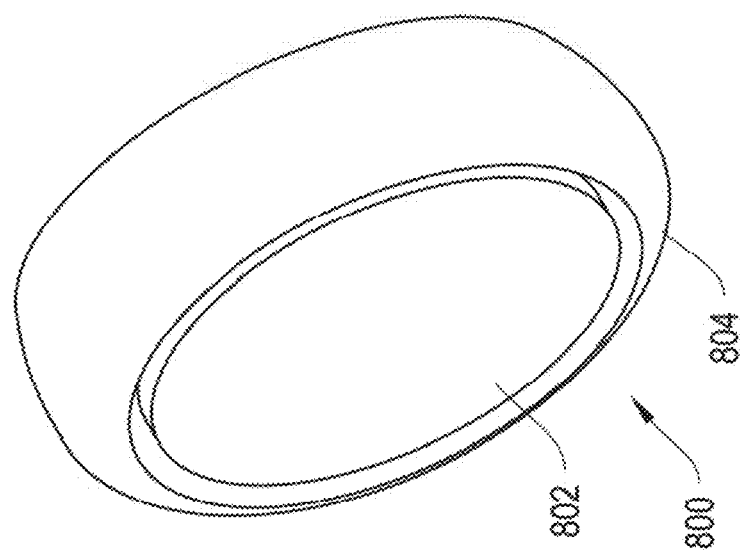
FIG. 8 depicts an oblique view of an exemplary vibrator capable of being used in the vibration devices of FIGS. 5-6C, 9-12, and 16.

FIG. 8 depicts an exemplary vibrator 800 that can be used in the vibration device 600. The vibrator 800 has a diaphragm 802 capable of vibrating in response to an electrical signal. The diaphragm 802 can be between 0.5 inches and 4 inches in diameter, with a preferred size dependent on the user's size. In particular, the diaphragm diameter can be approximately 20% of a lateral length measured from a first shoulder of the user to a second shoulder of the user. A thin cushion (not shown) can overlay the diaphragm 802 and be disposed between the diaphragm 802 and the user to soften the impact of the vibrations on the user. The thin cushion may be made of any suitable material that is sufficiently resilient and can provide padding, such as a silicone gel. An external surface of the diaphragm 802 can be any suitable material that is sufficiently tacky to prevent slippage when the external surface rests against skin or fabrics typically used in clothing. Examples of suitable materials include synthetic rubber, polyurethane, fabric used to cover audio speakers, and foam cushion used to cover headphone speakers. The surface material is typically between 1 mm and 5 mm in thickness. A cushion 804 can encircle the vibrator 800 to protect the edge of the diaphragm 802.

Figure 9:
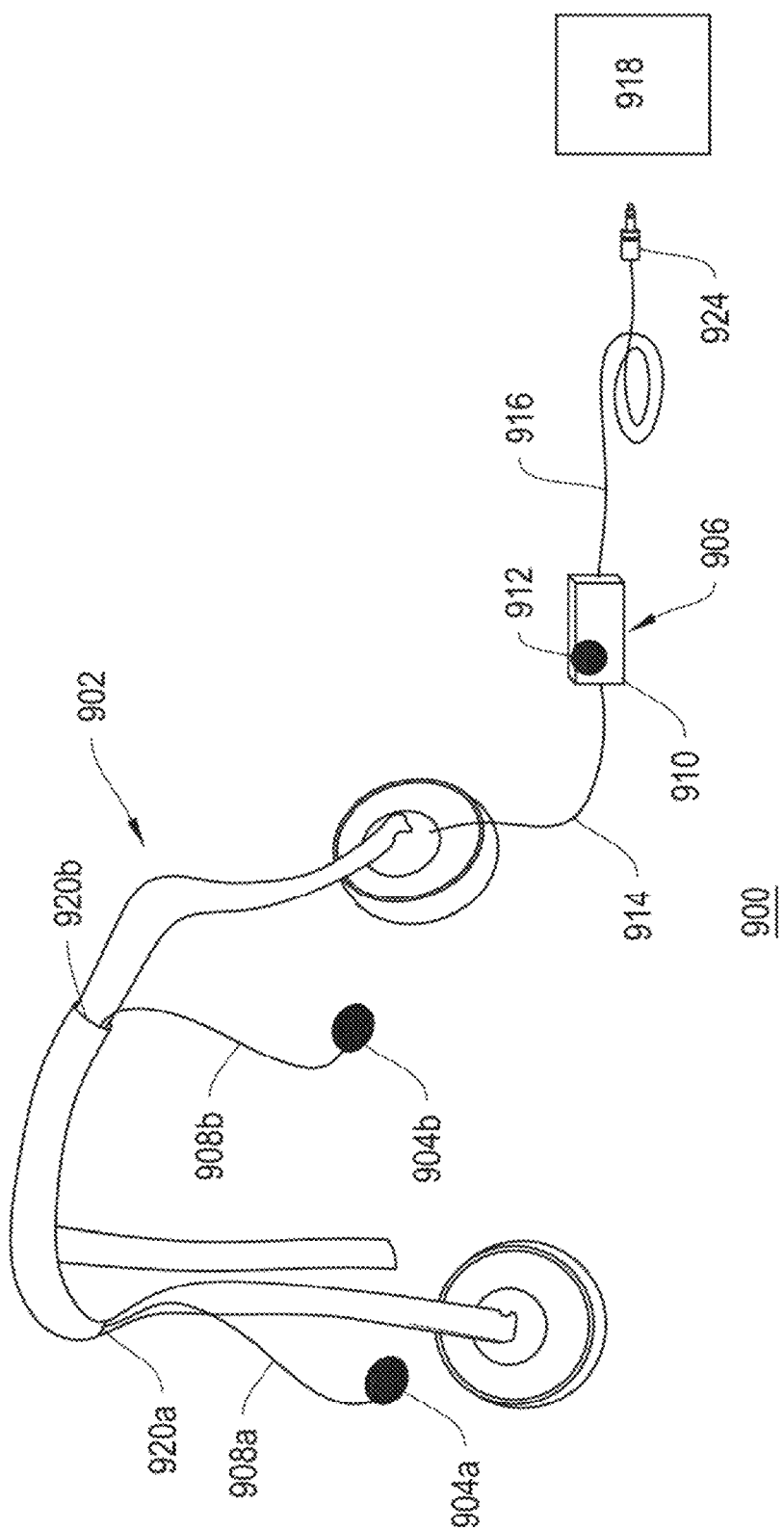
FIG. 9 depicts a front view of an exemplary vibration system for experiencing audio and haptic data.

FIG. 9 depicts an exemplary vibration system 900 for experiencing audio and haptic data according to one aspect of the disclosure. The vibration system 900 includes a vibration device 902, optional audio speakers 904a and 904b, and a processor 906. The vibration device 902 is described below in reference to FIGS. 10A-11. The optional audio speakers 904a and 904b can be any suitable audio device, such as an earphone, headphone, or neckphone, and can be attached by wires 908a and 908b to the vibration device 902 at joints 920a and 920b. Alternatively, the audio speakers can be separate from the vibration device 902 or the user can opt to not have or use audio speakers in conjunction with the vibration device 902.

The depicted processor 906 includes a housing 910 that encases the processing circuitry, and supports user control interfaces such as a button, switch, or dial 912. The housing attaches by wire 914 to the vibration device 902 and by wire 916 to any suitable source 918 of audio or haptic data, such as a portable music device or video game console. The wires 914 and 916 may each have an audio jack, such as the audio jack 924 attached to the end of the wire 916, for connecting to, respectively, the processor 906 and the data source 918. Alternatively, the vibration device 902 can attach directly to a data source 918. In another alternative, the vibration device 902, the processor 906, and the data source 918 can include, respectively, a wireless receiver, a wireless transceiver, and a wireless transmitter for communicating audio or haptic data.

FIGS. 10A-11 depict in more detail an illustrative embodiment of the vibration device 902. In particular, FIGS. 10A-10C depict, respectively, a front view, a side view, and a top view of an exemplary vibration device 1000 having two vibrators 1002a and 1002b positioned by a support structure 1004. The vibrators 1002a and 1002b, described above in reference to FIG. 8, can include any suitable mechanism capable of transforming an electrical signal into vibration. The vibrators 1002a and 1002b attach via vibrator joints 1024a and 1024b to a support structure 1004 that includes bent elements 1006a and 1006b joined at bent element joints 1020a and 1020b to a semi-circular element 1008. The semi-circular element 1008 attaches via a midpoint joint 1022 to a long element 1010 depending vertically from a midpoint of the semi-circular element 1008. The support structure 1004 can be made of any suitably light, tensile material such as plastic and have a surface sufficiently tacky to prevent slippage when the surface rests against skin or fabrics typically used in clothing. Examples of suitable materials include synthetic rubber and fabric used to cover audio speakers.

FIG. 11 depicts a vibration device 1100 being worn by a user 1112. A semi-circular element, which is not shown, is adapted to encircle a back of a neck of the user 1112 with a long element, also not shown, centered on an upper back of the user 1112. The bent elements 1106a and 1106b are adapted to attach to vibrators 1102a and 1102b and feature bends 1114a and 1114b having an angle configured to fit on a front shoulder of the user 1112. Accompanying audio speakers can be earbuds 1116a and 1116b attached by wires 1120a and 1120b to the vibration device 1100 and adapted to fit within ears 1118a and 1118b of the user 1112.

FIG. 12 depicts a front view of another exemplary vibration device 1200 being worn by a user 1214. The vibration device 1200 has two vibrators 1202a and 1202b supported by a loop of stretchable band 1206 that loops around the neck 1218 of the user. The stretchable band 1206 has two substantially symmetric front portions 1206a and 1206b, whose ends 1204a and 1204b meet at a point 1216 to form a V shaped structure adjacent to the chest of the user 1214, and a back portion 1206c that curves around the back of the neck 1218 of the user. The vibrators 1202a and 1202b, described above in reference to FIG. 8, attach to front portions 1206a and 1206b, respectively, and can include any suitable mechanism capable of transforming an electrical signal into vibration. The ends 1204a and 1204b connect to a vertical stretchable band 1208 that depends from the point 1216 to approximately the waist of the user. The stretchable bands 1206 and 1208 may be made of any suitable material that is sufficiently flexible and stretchable, such as elastic fabric. Vertical stretchable band 1208 may have a fastener 1210, attached to a free end 1208a. The fastener 1210 can be any suitable device capable of attaching to a waistband 1212 of clothing to hold the vibration device 1200 in place.

FIGS. 13-15 depict other vibrator location arrangements 1300, 1400, and 1500 on a human body. In particular, FIG. 13 depicts vibrator locations 1302a and 1302b with respect to the body's underlying musculature; FIG. 14 depicts vibrator locations 1402a and 1402b with respect to the body's underlying skeletal system; and FIG. 15 depicts vibrator locations 1502a and 1502b with respect to the body's external surface.

As depicted by FIG. 13, vibrator location arrangement 1300 has vibrator locations 1302a and 1302b disposed symmetrically across a torso of the body. A first vibrator location 1302a is located adjacent to a first abdominal external oblique muscle 1304a; and similarly a second vibrator location 1302b is located adjacent to a second abdominal external oblique muscle 1304b. Both vibrator locations 1302a and 1302b can be located on the front-back coronal plane 410, depicted in FIG. 4.

As depicted by FIG. 14, vibrator location arrangement 1400 has vibrator locations 1402a and 1402b disposed symmetrically across a torso of the body. A first vibrator location 1402a is located adjacent to a region 1406a of a rib cage which includes the third through tenth rib, known as costae verae III-X; and similarly a second vibrator location 1402b is located adjacent to a region 1406b of a rib cage which includes the third through tenth rib. Both vibrator locations 1402a and 1402b can be located on the front-back coronal plane 410, depicted in FIG. 4.

As depicted by FIG. 15, vibrator location arrangement 1500 has vibrator locations 1502a and 1502b disposed symmetrically across a torso of the body. A first vibrator location 1502a is located adjacent to a first abdominal external oblique muscle 1504a; and similarly a second vibrator location 1502b is located adjacent to a second abdominal external oblique muscle 1504b. Both vibrator locations 1502a and 1502b can be located on the front-back coronal plane 410, depicted in FIG. 4.

Figure 16:
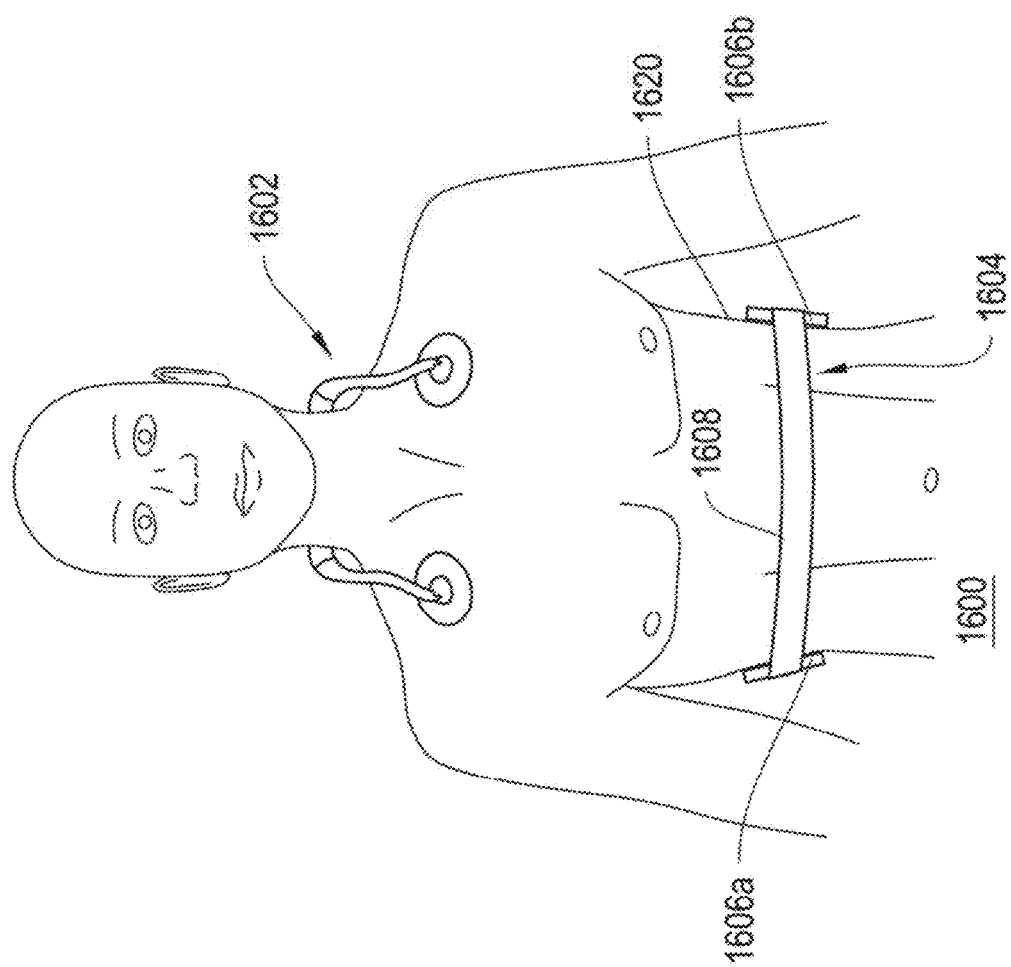
FIG. 16 depicts a front view of an exemplary vibration device for applying vibrations to the user.

Vibrator location arrangements 1300, 1400, and 1500 may be implemented by the exemplary vibration device 1600 depicted in FIG. 16. Vibration device 1600 includes a chest vibration device 1602, which is similar to vibration devices 902, 1000, and 1100 described above and depicted in FIGS. 9-11, and a torso vibration device 1604. Alternatively, the user can opt to use the torso vibration device 1604 without the chest vibration device 1602. The torso vibration device 1604 includes a right vibrator 1606a and a left vibrator 1606b both attached to a stretchable band 1608 which encircles a torso 1620 of the human body. The vibrators 1606a and 1606b can include any suitable mechanism capable of transforming an electrical signal into vibration. The stretchable band 1608 can be made of any suitable material that is sufficiently flexible and stretchable, such as elastic fabric. The surface of the stretchable band 1608 is preferably adapted to reduce slippage when disposed on clothing or skin to prevent the torso vibration device 1604 from moving with respect to the torso 1620.

Figure 17:
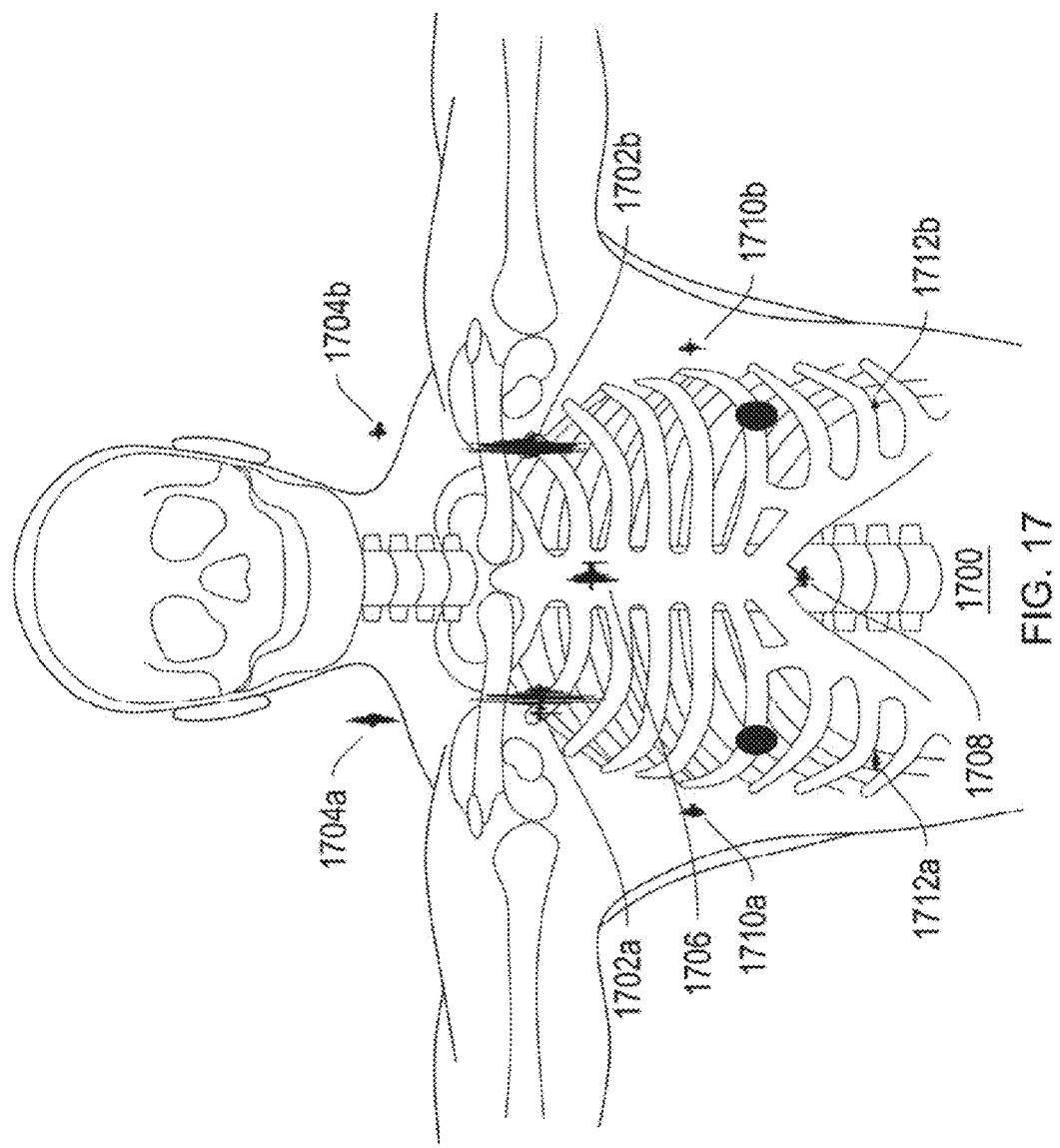
FIG. 17 depicts a natural surface vibration pattern that can be used to determine vibrator locations.

Other vibrator arrangements may also enhance a user's interaction with audio or visual content being presented. According to another aspect of the disclosure, one characteristic of a vibrator arrangement uses a pattern of vibrations measured on a human body's surface, called a surface vibration pattern. A natural surface vibration pattern occurs when the user generates sound, such as when the user is laughing or shouting. FIG. 17 depicts an exemplary natural surface vibration pattern 1700 of a user. In particular, FIG. 17 depicts pictorially the mechanical vibrations recorded at a variety of surface locations on the body's torso. A stethoscope was placed in contact with each surface location and coupled at its opposing end to a microphone, whose electronic signal output was recorded when the user was generating sound. Each waveform depicted in FIG. 17 represents the output recorded at that location and is sized according to the same scale to demonstrate the relative amplitudes of the surface locations. Other tests may also be suitable for measuring the surface vibrations on the body. In this example, the amplitudes are largest at symmetric pectoralis major muscle locations 1702a and 1702b, smaller at symmetric upper trapezius muscle locations 1704a and 1704b and a sternum location 1706, and smallest at a xyphoid process location 1708, underarm locations 1710a and 1710b, and sides of the ribcage locations 1712a and 1712b.

Figure 18:
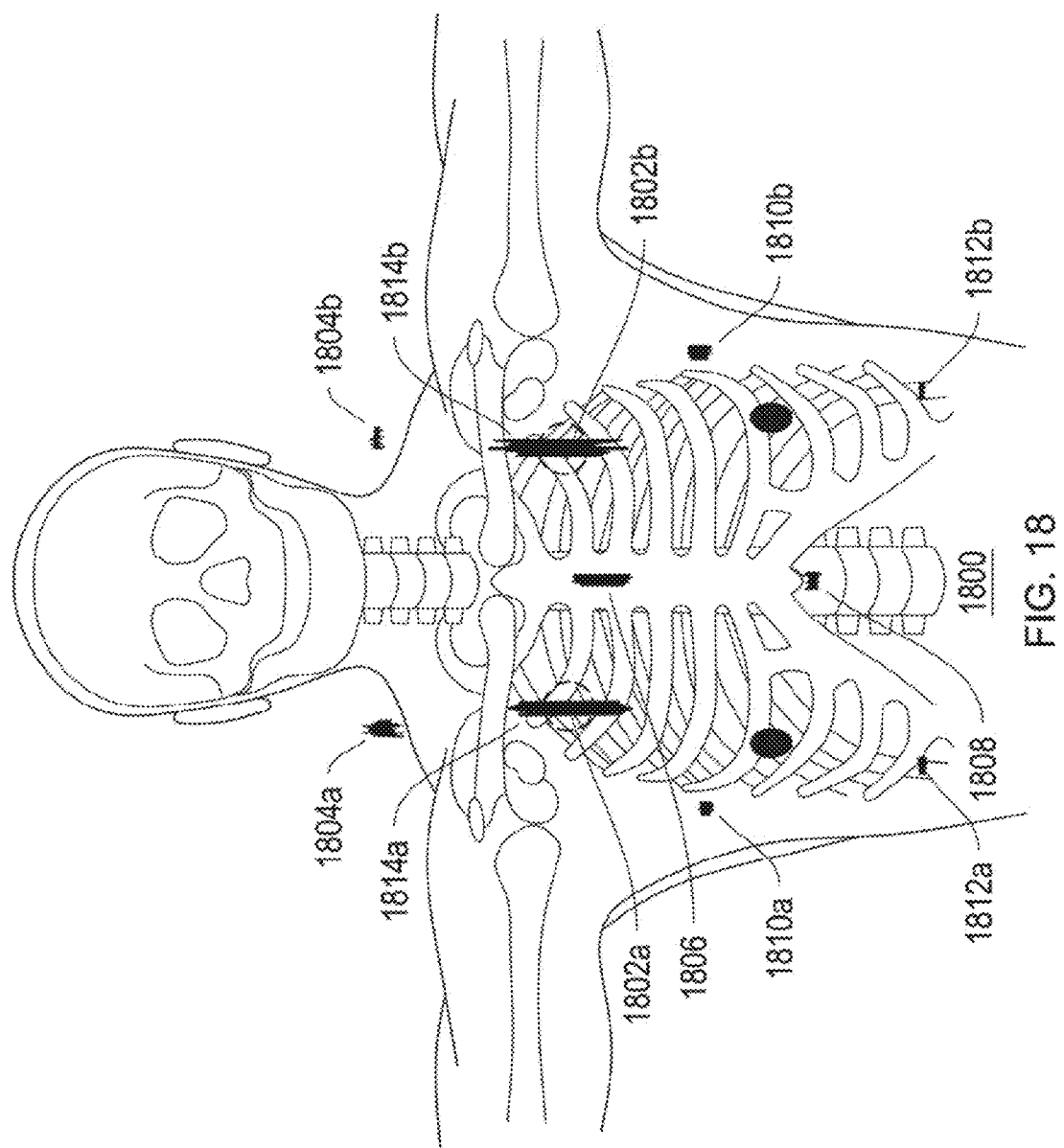
FIG. 18 depicts a vibrator-induced surface vibration pattern that can be used to evaluate vibrator locations.

A vibrator location arrangement can induce a surface vibration pattern similar to the natural surface vibration pattern. This similarity in surface vibration patterns is preferably with respect to relative amplitudes across a variety of surface locations on the body. An exemplary vibrator-induced surface vibration pattern 1800, depicted in FIG. 18, has relative amplitudes across a set of surface locations that are similar to those of the natural surface vibration pattern 1700 depicted in FIG. 17. The amplitudes depicted in FIG. 18 were found in a similar manner to those of FIG. 17, except the microphone output was recorded when the user was using an exemplary vibration device instead of when the user was generating sound. In particular, the average amplitudes depicted in FIG. 18, like those of FIG. 17, are largest at symmetric pectoralis major muscle locations 1802a and 1802b, smaller at symmetric upper trapezius muscle locations 1804a and 1804b and a sternum location 1806, and smallest at a xyphoid process location 1808, underarm locations 1810a and 1810b, and sides of the ribcage locations 1812a and 1812b. The vibrators used to generate the vibrations of FIG. 18 were arranged in locations 1814a and 1814b, similar to vibrator location arrangements 100, 200, 300, and 400. Additional testing may be performed to determine other possible vibrator location arrangements that may create an immersive experience for the user.

Vibrator location arrangements can be symmetric with respect to the body's front-back coronal plane 410 and left-right median plane 412, depicted in FIG. 4. An arrangement of locations that is symmetric with respect to a plane may include locations that are on the plane, such as vibrator location 402, depicted in FIG. 4, which lies on the front-back coronal plane 410. Vibrator location arrangements symmetric with respect to the left-right median plane 412 include vibrator location arrangements 100, 200, 300, 1300, 1400, and 1500, depicted in FIGS. 1-3 and 13-15.

Vibrator location arrangements can space vibrators away from a sternum of the body, as depicted in vibrator location arrangements 100, 200, 300, 1300, 1400, and 1500 of FIGS. 1-3 and 13-15. Prolonged vibration of the sternum can irritate and inflame cartilage that connects the sternum to the ribs, creating a painful condition known as costochondritis.

A vibration system as described above may receive electrical signals containing audio, haptic, and other data from a variety of media and devices. Example media include music, movies, television programs, video games, and virtual reality environments. Example devices that can provide data and be used in conjunction with a vibration device include portable music players, portable video players, portable video game consoles, televisions, computers, and home entertainment systems. Exemplary vibration systems may connect to exemplary devices via an audio jack coupled to a wire, as depicted in FIGS. 5 and 9, or may contain a wireless receiver for wirelessly receiving signals from a device equipped with a wireless transmitter. In certain embodiments, the exemplary vibration systems may be included within a media device (e.g., portable electronic device) such that the media device forms part of the vibration system.

Using a vibration device in conjunction with a media device can enhance the user's interaction with the media by creating tactile sensations that synchronize with the data being presented by the media device. For example, soundtracks that accompany movies typically have, in addition to music and dialogue, sounds that accompany the action in the movie, such as a door slamming or an explosion. The vibration device, by transforming these sounds into vibrations, allows the user to simultaneously feel this action in addition to seeing and hearing it, which can create a more immersive experience for the user. This immersive effect can be especially desirable when the visual data is poor, for example portable devices with small video screens or computer monitors with relatively low resolution. As another example, the user's perception of music may be enhanced by the vibration device, which can create a tactile sensation synchronized with the music by using the same data source as the audio speakers. This enhancement can be especially desirable for experiencing the low frequency component, also known as bass.

The vibration device can include processing circuitry capable of processing electrical signals for enhancing the content perceived by the user or allowing the user to modify the content. Processing circuitry may be housed externally to the vibration device, as depicted in the embodiments of FIGS. 5 and 9, or internally within the vibration device.

Exemplary functions of processing circuitry include pitch control, volume control, fade-in, amplitude-ceiling, auto shut-off, channel separation, phase-delay, and bass enhancement, whose implementations are well-known to one skilled in the art. Pitch control allows a user to increase or decrease the overall frequency of an electrical signal. Volume control allows a user to increase or decrease the overall amplitude of an electrical signal. Fade-in gradually increases the amplitude of the beginning of an electrical signal to lessen the initial impact of vibrations on a user. Amplitude-ceiling creates an upper bound on the magnitude of the amplitude of the electrical signal to prevent the user from experiencing excessively intense vibrations. Auto shut-off turns off the processing circuitry to conserve power without receiving input from the user and when an electrical signal has not been received for a preset amount of time. Channel separation separates a stereo or multichannel signal into its component channels. Phase-delay delays a signal sent to a second vibrator with respect to a signal sent to a first vibrator to give the user the impression the sound originated from a location closer to the first vibrator than the second vibrator. Bass enhancement increases the amplitude of the bass component of an electrical audio signal relative to the rest of the signal.

Examples of multichannel signals that can be separated by processing circuitry include stereo sound, surround sound, and multichannel haptic data. Stereo sound typically uses two channels. Channel separation circuitry can separate a stereo sound two-channel electrical audio signal into a left channel signal and a right channel signal intended to be experienced by the user from, respectively, a left-hand side and a right-hand side. Multichannel electrical audio signals, such as those used in 5.1 and 6.1 surround sound, can similarly be separated, and typically contain rear channel signals intended to be experienced by the user from the rear. Channel separation circuitry can also separate multichannel haptic data, such as those used with video games or virtual reality environments, that similarly contain data intended to be experienced by the user from a specific direction.

Multiple implementations of bass enhancement are possible. An exemplary processing circuitry 1900 for bass enhancement is depicted in FIG. 19. An electrical signal is received at an input 1902 for transmitting to a vibration device 1904 and audio speakers 1906. A low frequency cross-over circuit 1908 can filter through only the bass component of the received electrical signal, whose overall amplitude is increased by an amplifier 1910 before reaching a vibration device 1904.

Another bass enhancement implementation increases the bass component without filtering out the rest of a signal. Processing circuitry can sample a received electrical signal to create a sampled signal, modulate the pitch of the sampled signal to create a modulated sampled signal, and mix the modulated sampled signal with the received electrical signal to create a signal for the vibration device. The modulation of the pitch preferably lowers the pitch of the sampled signal to increase the bass component of the signal received by the vibration device. The user may also control the degree of bass enhancement by lowering the overall frequency of a signal using pitch control.

Processing circuitry can send different signals, each based on an electrical signal received from a source of data, to different destinations. The different destinations can include audio speakers and vibrators that are differentiated by their position relative to the body. For example, the electrical signals generated by channel separation can be transmitted to speakers or vibrators having appropriate positions relative to the body. In particular, signals intended to be experienced from the left can be sent to speakers or vibrators left of the left-right median plane, signals intended to be experienced from the right can be sent to speakers or vibrators right of the left-right median plane, signals intended to be experienced from the rear can be sent to speakers or vibrators rear of the front-back coronal plane, and signals intended to be experienced from the front can be sent to speakers or vibrators anterior of the front-back coronal plane. Exemplary vibration device 600, depicted in FIG. 6, can include a rear vibrator 610 for receiving a rear channel generated by channel separation processing circuitry. Exemplary torso vibration device 1604, depicted in FIG. 16, can include a left vibrator 1606b and a right vibrator 1606a for receiving, respectively, a left channel and a right channel generated by channel separation processing circuitry.

Processing circuitry can also combine multiple functions and can apply different sets of functions to electrical signals depending on their destinations. Preferably, signals sent to vibrators have undergone bass enhancement. For example, the embodiment 1900 depicted in FIG. 19 applies a bass enhancement implementation 1908 and 1910 to an electrical signal destined for a vibration device 1904, and applies a direct coupling between the input 1902 and an electrical signal destined for audio speakers 1906. Different speakers and vibrators may also each have individual controllers to allow the user more flexibility in controlling the immersive experience.

Once the electrical signals have been processed, the modified electrical signals can be transmitted to a vibration device, exemplified by vibration devices 502, 902, 1200, and 1600 depicted in, respectively, FIGS. 5, 9, 12, and 16. The vibration devices have vibrators capable of transforming received electrical signals into mechanical movement. The mechanical movement can take the form of a vibration whose amplitude and frequency match those of the received electrical signal. In a preferred embodiment, the vibrator has a flat or concave surface, called a diaphragm, that vibrates to create the matching mechanical movement. Examples of mechanisms capable of generating vibration in response to an electrical signal include an inertial transducer, a piezoelectric transducer, a tactile transducer, and a motor with an off-balance rotor.

The support structure of the vibration device can serve multiple purposes for insuring the vibration device imparts an immersive experience to the user. The support structure can dispose vibrators in vibrator location arrangements and insure the vibrators can transfer vibration to the user. Other support structure qualities include a comfortable fit, ease of use, and an inconspicuous presence when worn.

The support structure of the vibration device can be configured to position vibrators according to vibrator location arrangements, such as those described above and in reference to FIGS. 1-4 and 13-15. For example, the support structure of the vibration device 502 depicted in FIG. 5 positions vibrators in vibrator locations 522a and 522b. Similarly, the support structure 604 depicted in FIGS. 6A-6C can position the vibrators 602a and 602b according to vibrator location arrangements 100, 200, 300, and 400 depicted in FIGS. 1-4. The user can also adjust the positioning of the vibrators by using the adductor joint 612 to adjust the harnesses 606a and 606b laterally and the adjustable endpieces 612a and 612b to adjust the length of the harnesses 606a and 606b. The support structure 1004 depicted in FIG. 10 and the suspenders 1204 depicted in FIG. 12 can position vibrators, respectively, 1002a and 1002b, and 1202a and 1202b, also according to vibrator location arrangements 100, 200, 300, and 400 depicted in FIGS. 1-4. The stretchable band 1608 of the torso vibration device 1604 depicted in FIG. 16 can position vibrators 1606*a* and 1606*b* according to vibrator location arrangements 1300, 1400, and 1500.

The support structure can also be configured to align a diaphragm 802 of a vibrator 800, depicted in FIG. 8, substantially parallel to a surface of the user at the vibrator location to insure that as much as possible of the diaphragm 802 is in contact with the user. For example, the support structure 604 depicted in FIGS. 6A-6C has vibrator joints 618*a* and 618*b* capable of adjusting the angle at which the vibrators 602*a* and 602*b* are oriented. The user can adjust the vibrators 602*a* and 602*b* to an angle that orients the diaphragms of the vibrators 602*a* and 602*b* substantially parallel to the surface of the chest of the user 520 at vibrator locations 522*a* and 522*b* depicted in FIG. 5. Similarly, the support structure 100 depicted in FIGS. 10A-10C has vibrator joints 1020*a* and 1020*b* capable of adjusting the angle at which the vibrators 1002*a* and 1002*b* are oriented.

The support structure can also be configured to push the vibrators against the body to insure the user can sense the vibrations of the vibrators. Support structures that include tensile elements can have rigidity sufficient to push the vibrators against the body. For example, the support structure 604 depicted in FIGS. 6A-6C has curved harnesses 606*a* and 606*b* configured to flex inwardly, which pushes the vibrators 602*a* and 602*b* against the body. In another example, the support structure 1004 depicted in FIG. 10 includes a long element 1010 attached to a semi-circular element 1008. The angle between the long element 1010 and a plane of the semi-circular element 1008 is preferably sufficiently acute to push the vibrators 1002*a* and 1002*b* against the body. Other embodiments contain non-tensile support structures configured to push the vibrators. For example, support structures that include stretchable bands, such as the suspenders 1204 depicted in FIG. 12 and the stretchable band 1608 depicted in FIG. 16, can be made of an elastic material. The elasticity of the stretchable bands pushes the vibrators 1202*a*, 1202*b*, 1606*a*, and 1606*b* against the body.

The support structures described herein can be configured to fit snugly without being too compressive on the body, are straightforward to put on over the shoulders or around the torso, and can be worn underneath clothing without significantly altering the profile of the clothing.

Embodiments of the vibration device may also be foldable to facilitate storage and portability of the device. Vibration device support structures that can be made of fabric, such as the suspenders 1204 depicted in FIG. 12 and the stretchable band 1608 of the torso vibration device 1604 depicted in FIG. 16, can easily fold into a myriad of shapes. Vibration devices made of a more rigid material can have joints or hinges for facilitating folding.

For example, exemplary vibration device 600 depicted in FIGS. 6A-6C can have joints 612, 616*a*, and 616*b* adapted for folding up the vibration device 600. In particular, the adductor joint 612 can adduct the two harnesses 616*a* and 616*b* together; and the harness joints 616*a* and 616*b* can allow the vibrators 602*a* and 602*b*, respectively, to fold towards the point of attachment 608. The joints 612, 616*a*, and 616*b* preferably have one degree of freedom and can be spring-loaded.

Similarly, exemplary vibration device 1000 depicted in FIGS. 10A-10C can have joints 1020*a*, 1020*b*, and 1022 adapted for folding the vibration device 1000 into substantially the same plane as the semi-circular element 1008. In particular, the bent element joints 1020*a* and 1020*b* can allow the bent elements 1006*a* and 1006*b* to fold upward and inward; and the midpoint joint 1022 can allow the long element 1010 to fold upward and inward. The joints 1020*a*, 1020*b*, and 1022 preferably have one degree of freedom and can be spring-loaded.

The application includes an apparatus connectable with a portable electronic and/or consumer electronics device that provides haptic information and/or feedback to a user of the portable electronic device. The apparatus may also function as a partial housing for a portable electronic device. The apparatus may include an electrical and/or mechanical connection with a portable electronic device to enable to the exchange of electronic data between the apparatus and portable electronic device. The apparatus may include one or more transducers that provide at least one of audio and haptic output to a user of the portable electronic device. The haptic and/or audio information may be associated with media being displayed, played, and/or stored on the portable electronic device. The apparatus housing may include a hard case having a relatively low mass to enhance the propagation of haptic information (e.g., vibrations). A user may interface with the apparatus via one or both hands. In certain embodiments, the apparatus may clip on to a portable electronic device such that user may interface with the portable electronic device via one or both hands. The apparatus may be segregated into a plurality of physical regions where each region is associated with a vibration unit providing certain haptic information.

The docking apparatus may be arranged in any number of dimensions so as to releasbly hold a portable electronic device. A portable electronic device may include a cellular telephone, portable computer, tablet computer, personal digital assistant (PDA), portable electronic game device, a consumer electronic device, and/or a hand-held electronic device.

Figure 20A:
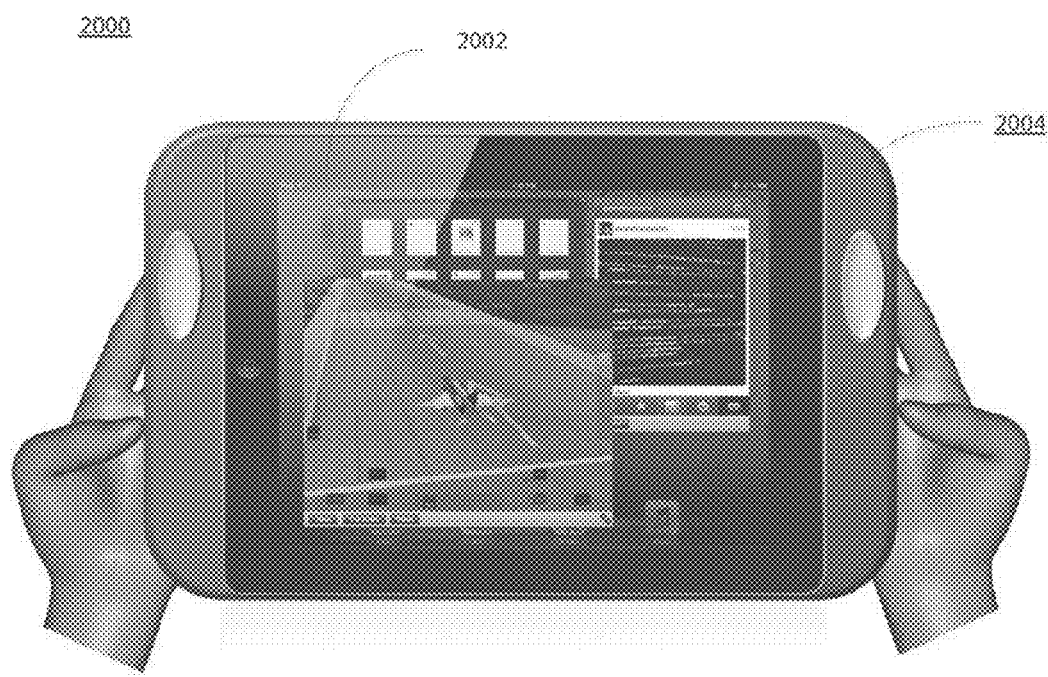
FIGS. 20A-22B depict exemplary docking units for a portable electronic device and exemplary techniques for attaching a vibration device to the exemplary docking units.
Figure 20B:
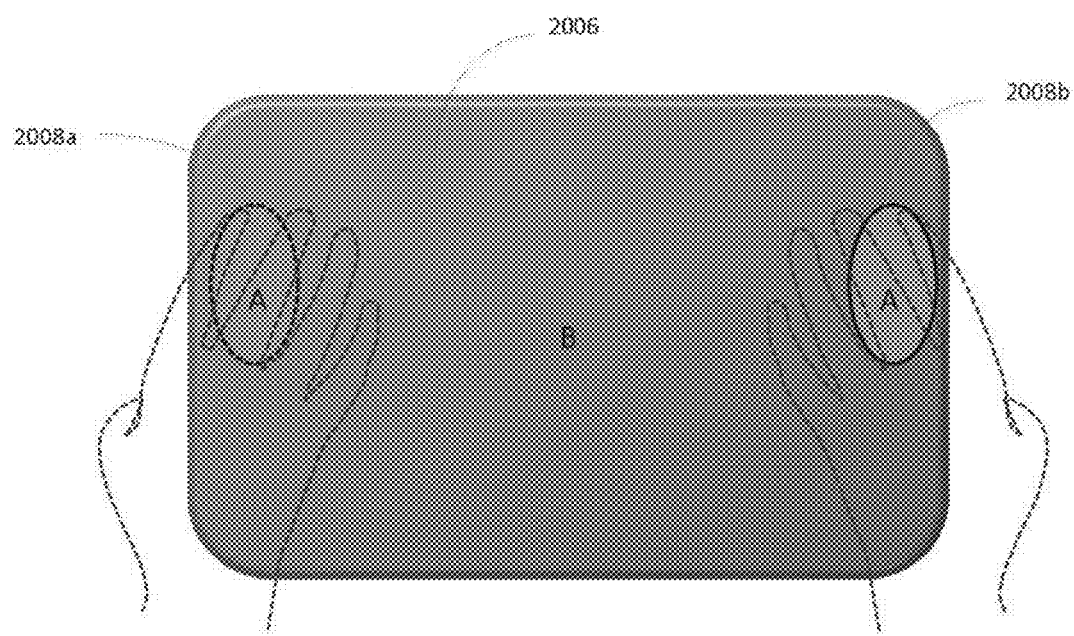
Figure 20C:
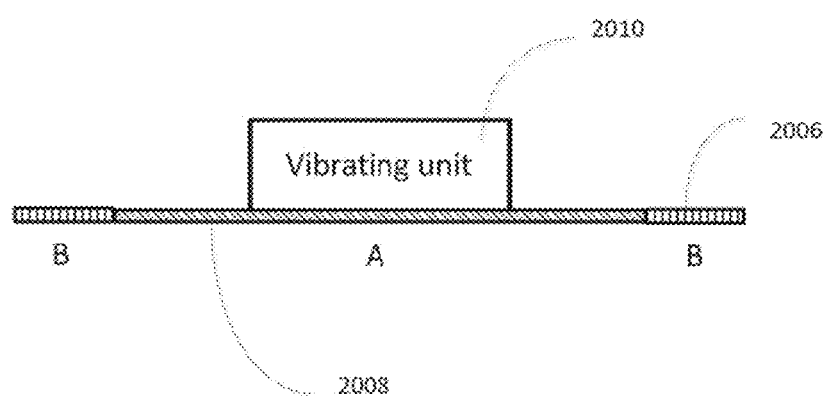
Figure 21A:
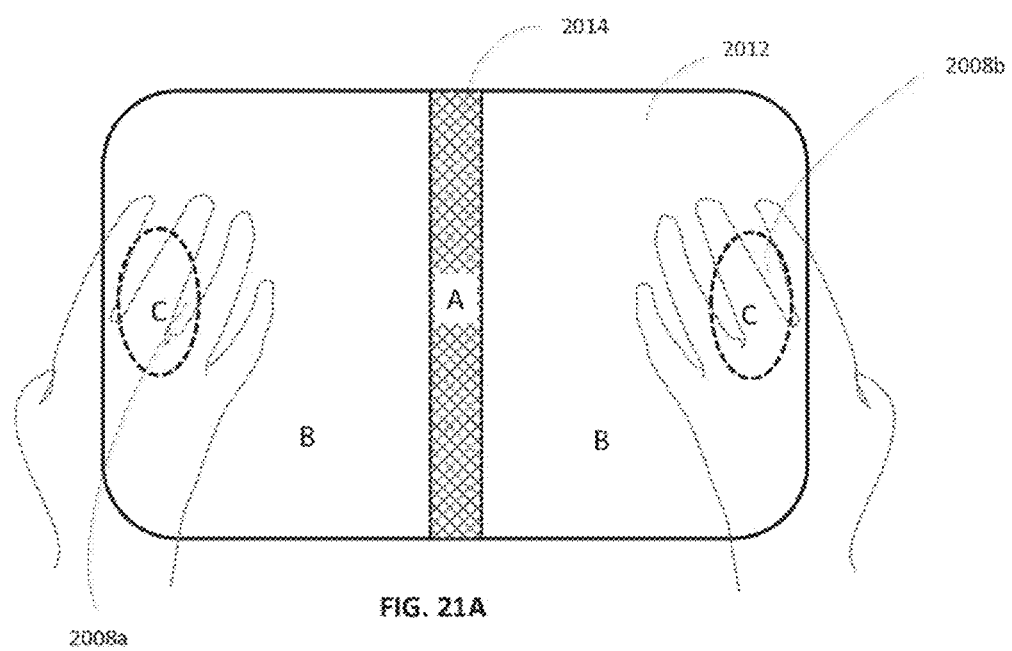
Figure 21B:
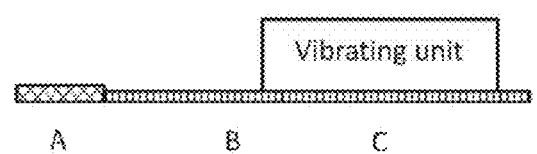
Figure 22A:
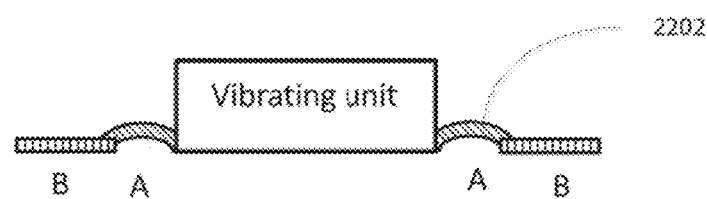
Figure 22B:
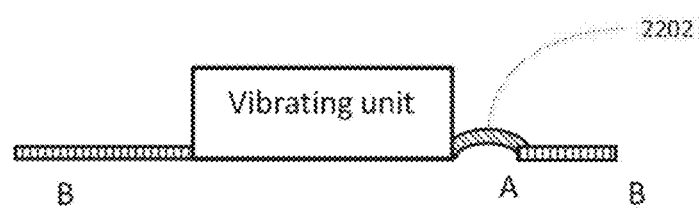

In some configurations, as shown in FIGS. 20A-20C, a vibrating unit 2010 or element is rigidly attached to an elastic membrane that easily transfers vibrations to its surface (A) 2008 but dampens vibration being transferred to adjacent non-elastic hard surface (B) 2006 that's connected to A e.g. by comolding. The user's fingers touching surface A 2008*a* and 2008*b* can feel the vibration, but the vibration is attenuated when touching surface B 2006. This allows isolation of different vibration effects being experienced on the elastic surfaces (A) 2008*a* and 2008*b* if two or more such vibrating surfaces are present. An example is shown in FIGS. 20A and 20B, where two (Right and Left) vibrating surfaces 2008*a* and 2008*b* are present and independent vibration of each area allow various possibilities such as directional information on gun shots in a mobile game, or sensation of motion by sequentially vibrating Right and Left vibrators with a variable lag that provides sensation of the Haptic effect moving from one to the other side. In certain configuration, as shown in FIGS. 21A-21B, the elastic membrane surface 2008 overlaying the vibrating unit 2010 may be adjacent to another similar or different elastic layer 2012 which in turn may be adjacent to a non-elastic hard surface 2014. In such a configuration, the docking apparatus may allow for a larger region on which the user's fingers may be the vibration. To allow for further haptic effects, the vibrating unit 2010 may itself be attached to one or more damping materials A 2202 on one or more sides of the vibrating unit 2010, as shown in FIGS. 22A and 22B.

Figure 23A:
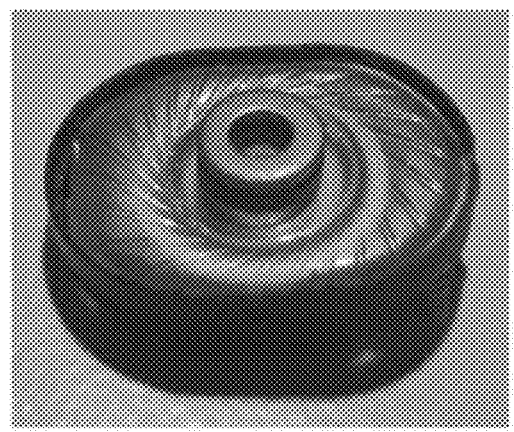

The application also discloses a vibrating unit that includes an acousto-haptic (ACH) speaker as described in U.S. Patent Publication No. 2010/0260371, the contents of which are incorporated by reference herein in their entirety. The mass elements of the ACH speaker may be rigidly connected to a diaphragm so that harmonics generated by the surface covered by the adhesion surface are minimized, and the mass is moved away from the surface so as to allow proper emission of the sound without blocking it. In FIG. 23A, an annular mass element 2300 with partial base is shown. The sound from the region inside the annulus can be emitted without the mass element blocking it. FIGS. 23B and 23C depicts an ACH speaker 2304 is shown in which the surface area of the adhesion zone 2308 of the mass element 2306 is kept small. Not to be bound by theory, but the smaller the surface area of the adhesion zone of mass diaphragm the better the quality of the audio even if it is partial. FIG. 23C depicts a mass element mounted on a three-pronged base. Generally, the base may include any suitable number of prongs without departing from the scope of the disclosure. In certain embodiments, care is given to the fact that the speaker produces symmetric vibrational modes, and that the mass element base is similarly symmetric to avoid wear and tear and breaking of the adhesive layer, which would cause the mass element to dislodge and damage the speaker. In certain configurations, the vibrator unit is rigidly attached to a device and has a low mass and suitable flexibility to allow for better transfer of vibration. In certain configurations, the mass may be greater than or equal to 0.01 grams. In some configurations, the mass may be greater than or equal to 0.1 grams. The mass may include a non-magnetic metal and/or any suitable material.

Figure 24A:
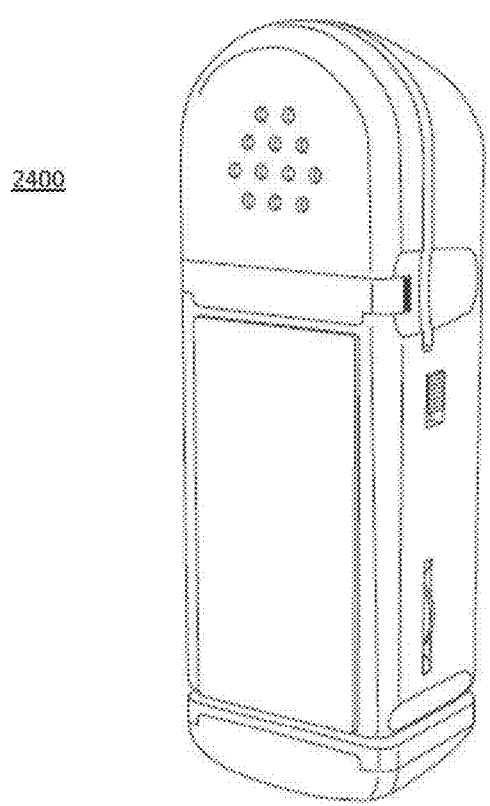
Figure 24B:
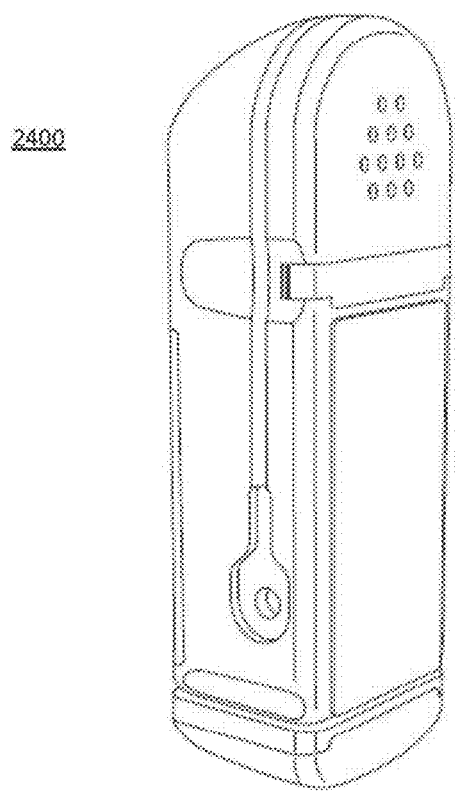
Figure 24C:
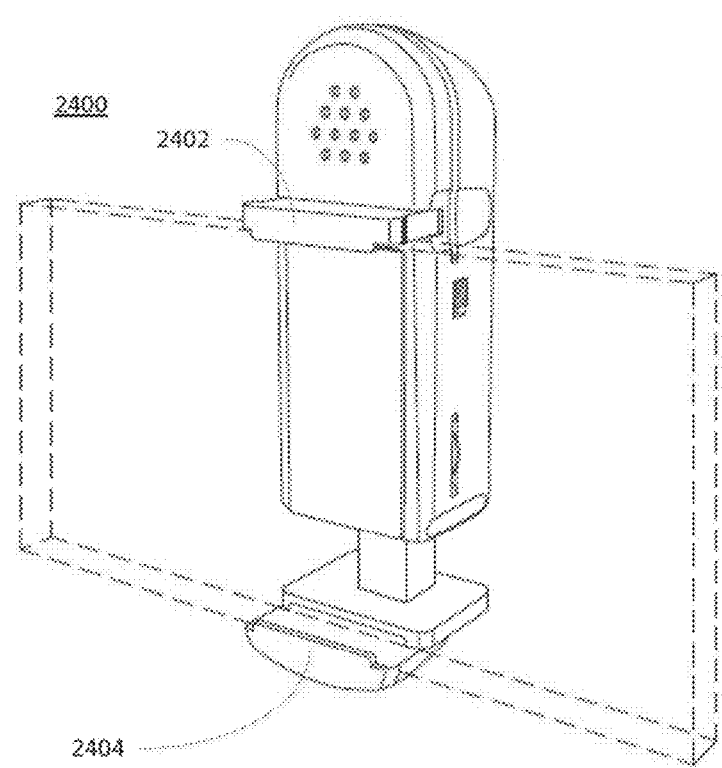

The application includes an apparatus connectable with a portable electronic and/or consumer electronics device such as a mobile phone or smartphone device that provides haptic information and/or feedback to a user of the portable electronic device. As depicted in FIGS. 24A-24D The apparatus 2400 may include an ACH speaker housed in a plastic housing and configured to clip on to a portable electronic device. In one implementation, the apparatus may have a closed state (shown in FIGS. 24A and 24B) and an open state (shown in FIGS. 24C and 24D). As shown in FIGS. 24A and 24B, the apparatus may be in a closed state to allow for convenient storage. In such a closed configuration, the outer surface of the housing may be generally smooth and compact. As shown in FIGS. 24C and 24D, the apparatus may be operable in an open state so that it may be coupled to a portable electronic device. In one implementation, in an open state, the apparatus may include two trays 2402 and 2404 that may be configured to grip the top and bottom of the portable electronic device. Each of these trays may be retractable such that in open state they may extend outwardly from the housing and in a closed state they may be retracted and secured within the housing. In certain implementations, the bottom tray 2404 may include a spring loaded extender that may be configured to exert force once the apparatus is in an open state. The spring loaded extender mechanism may allow the apparatus to couple with portable electronic devices having different widths. For example, the apparatus may couple with cellphones having widths ranging from 2 inches to 3.25 inches. The housing of the apparatus may be substantially rigid and formed from any suitable material, including, for example, high-gloss white plastic material. In certain embodiments, the apparatus may be about 3.4 inches in length, about 1.4 inches in width, about 0.8 inches in height and may weight about 0.1 lb.

During operation, a portable electronic device may be coupled with the ACH apparatus as shown in dashed lines in FIGS. 24C and 24D. Once coupled, the apparatus may be configured to generate at least one of sound and vibrations. The apparatus may be connected electrically with the portable electronic device and may be configured such that sounds generated by the portable electronic device are used by the apparatus to generate haptic signals. In certain embodiments, when the apparatus is coupled to the portable electronic device, the speaker output in the portable device may be automatically turned down or turned off. In such an embodiment, users may hear sounds generated from the portable electronic device via headphone, while experiencing haptic signals or vibrations generated from the apparatus.

In certain embodiments, as depicted in FIGS. 26A-26D, the application includes an apparatus having a vibrating membrane with a waveguide that transfers haptic or vibrational feedback to a user that touches the membrane using, for example, their finger. In one aspect, the membrane may be transparent, allowing the membrane to be overlaid over a touch screen, keypad, and/or keyboard to provide haptic feedback to a user as the user types on the touch screen. In this way, a user can continue to view the touch screen or display of a media device while experiencing haptic sensations from the vibrating membrane. The vibrating membrane may include a dissipation-free 1D or 2D waveguide to affect the transfer of vibrational energy to the point of contact between a user and the membrane. The membrane may operate concurrently with a processor and sound source that provides sounds with the vibrations such as the sound that emulates a key stroke. The system may include a datastore and/or database that stores haptic vibration files and/or sound files for playback when a user touches the membrane at one or more locations. The system may further include a processor arranged to receive input from the vibrating membrane indicating contact with a user and, in response, retrieving a file from the datastore to send to a vibration source coupled to the vibrating membrane, whereby the vibrating source converts the electronic data of the file to an acoustic and/or haptic signal emitted from the vibrating membrane. The vibrating membrane may be integral with and/or attached to a docking apparatus. In one configuration, the vibrating membrane and docket apparatus form a housing or skin for a portable electronic device such as a mobile phone, tablet, or PDA.

Not to be bound by theory, but a point source of waves generally radiates its power radially, and thus points farther away from the source receive less power compared to those closer to the source. Generally waveguides are media with low dissipation that allow an efficient transfer of the waveform from one point to the next in order to avoid this weakness. This principle typically applies to both transverse as well as longitudinal waves.

Figure 25A:
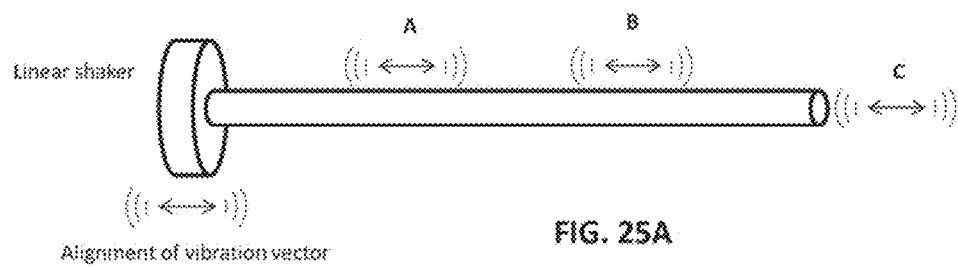
FIGS. 25A-26D depict exemplary waveguides for use with a portable electronic device.
Figure 26A:
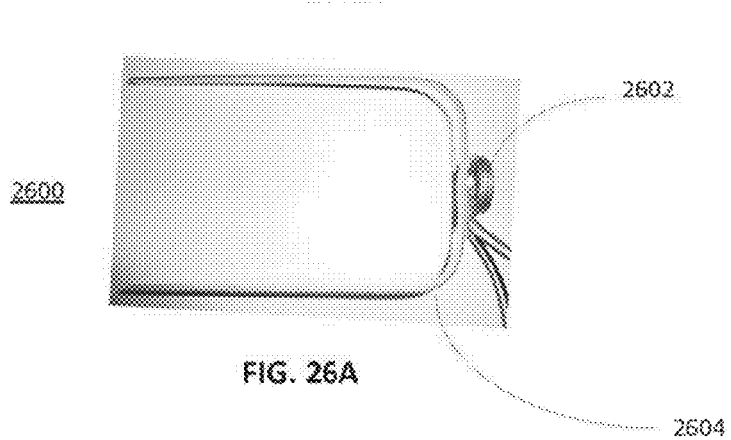

Haptic vibrations are also waveforms that, depending on the type of source, generate omnidirectional (offset mass motor) or unidirectional vibrations (linear motor shakers). As shown in FIG. 25A, if a narrow rigid beam or a strip is rigidly attached to a source, the energy of the vibration is transferred from the source to the end of the beam and anywhere along the beam. In the case of linear motor shakers, the vibration is directional such that the force generated is parallel to the displacement vector of the vibrating mass. If the rigid beam is connected to the linearly vibrating element parallel to the displacement vector, then since the entire beam is coupled and is considered to be incompressible, the entire beam moves back and forth, thus at any point along the beam the same amount of vibrational energy is found, providing a dissipation-free waveguide for the haptic vibration. The energy transfer of vibrations perpendicular to the beams are also improved for both 1D and 2D waveguides when rigid beams or strips are used, so a rotating offset mass vibrator can also be used as the vibrating element. FIG. 26A depicts an apparatus 2600 having a vibrating device 2602 and rigid waveguide elements 2604 extending on either side of the vibrating device 2602. The rigid elements 2604 may be positioned such that they extend along the sides of a portable electronic device, e.g., smartphone, placed in between.

Figure 25B:
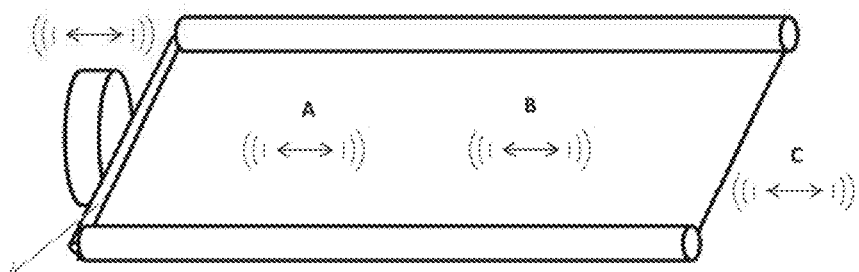
Figure 26B:
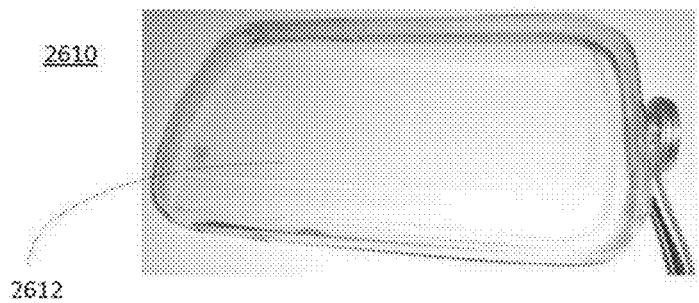

In certain embodiments, as shown in FIG. 25B, the above principle is applied to a 2D thin surface, as well. If the edges of the surface are made as narrow rigid beams, then, the vibrations of the source can be couple to the beams such that the entire surface of the 2D membrane vibrates along the displacement vector of the mass on the linear shaker. The plane of vibration would be the same as the surface of the membrane, and be of the longitudinal form. FIG. 26B depicts such an apparatus 2610 having a vibrating device, rigid waveguide elements extending on either side of the vibrating device, and a membrane 2612 extending therebetween. The interesting effect of such waveguides apart from dissipation-free distribution of vibration (i.e. every point on the surface provide the same intensity of vibration) is that if pressed by a finger, the curvature generated on the surface of the membrane by the tip of the finger changes the geometry of the vibration and thus produces some transverse as well as longitudinal vibrations.

Figure 26C:
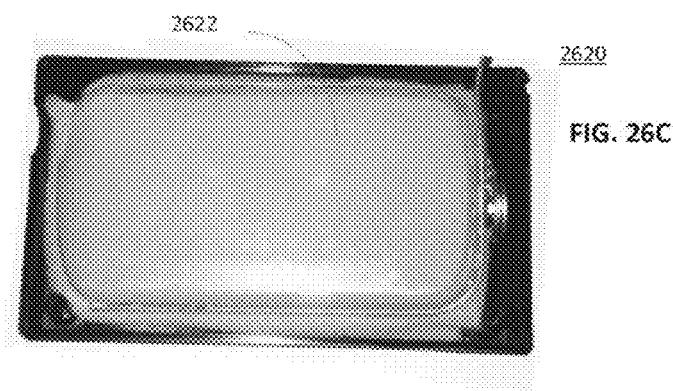
Figure 26D:
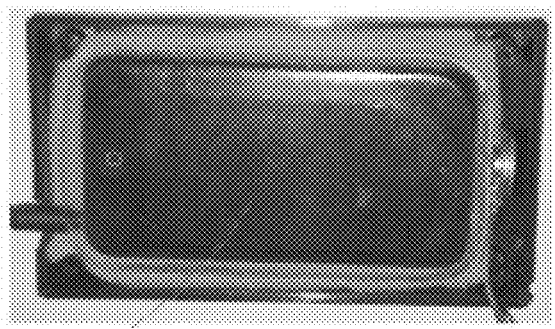

In certain embodiments, the vibration may be isolated to the rigidly connected members to the shaker, by either suspending the vibrating parts, or putting compressible membranes such as foam or thin rubber between the vibrating and non-vibrating parts. As shown in FIG. 26C, the vibrating portions of the apparatus 2620 may be placed in foam 2622. Moreover, as shown in FIG. 26D, the apparatus 2630 may be positioned such that a portable electronic device is placed under the membrane 2612.

Applicant considers all operable combinations of the embodiments disclosed herein to be patentable subject matter. Those skilled in the art will know or be able to ascertain using no more than routine experimentation, many equivalents to the embodiments and practices described herein. Accordingly, it will be understood that the disclosure is not to be limited to the embodiments disclosed herein.

The invention claimed is:

1. An apparatus comprising:
   a docking interface for releasably holding a portable electronic device;
   a communications interface electrically coupled to the portable electronic device for receiving electronic information generated by the portable electronic device, including audio information in a range of frequencies, wherein the range of frequencies falls within an audible range of frequencies;
   a housing arranged to surround a portion of the portable electronic device; and
   a first vibration unit electrically coupled to the communications interface and being positioned in a first region of the housing and receiving the audio information from the communications interface, the first vibration unit comprising:
      a first speaker including a first diaphragm; and
      a first mass element attached to the first diaphragm, wherein the mass of the first mass element is selected such that a portion of a first resonant frequency range of the combination of the first speaker and the first mass element falls within the range of frequencies;
   wherein the first mass element produces a first haptic output from the audio information for vibrating the housing.

2. The apparatus of claim 1 comprising a second vibration unit being positioned in a second region of the housing, the second vibration unit receiving a portion of the audio information from the communications interface, the second vibration unit comprising:
   a second speaker including a second diaphragm; and
   a second mass element attached to the second diaphragm, wherein the mass of the second mass element is selected such that a portion of a second resonant frequency range of the combination of the second speaker and the second mass element falls within the range of frequencies;
   wherein the second mass element produces a second haptic output from the audio information for vibrating the housing.

3. The apparatus of claim 2, wherein at least one of the first and second vibration unit outputs an audio output.

4. The apparatus according to claim 1 wherein the communication interface is an interface for connecting to an audio output connector of the electronic device, and further comprising,
   processing circuitry connected to the audio output for receiving a portion of the audio information and having a low-frequency filter circuit for filtering a bass component of the audio information and having an amplifier for increasing the amplitude of the bass component of the audio information for driving the first vibration unit coupled to the housing, thereby vibrating the housing to produce the first haptic output.

5. The apparatus of claim 1, wherein the first vibration unit is an acousto-haptic device, and wherein producing the first haptic output comprises producing the first haptic output simultaneously with an audio output.

6. An apparatus comprising:
   a housing arranged to attach to a portion of a portable electronic device, the housing having a docking interface for releasably holding the portable electronic device, and a communications interface electrically coupled to the portable electronic device for receiving electronic information generated by the portable electronic device, including audio information in a range of frequencies, wherein the range of frequencies falls within an audible range of frequencies; and
   a vibration unit being positioned in the housing, the vibration unit receiving a portion of the audio information and comprising:
      a speaker including a diaphragm; and
      a mass element attached to the diaphragm, wherein the mass of the mass element is selected such that a portion of a resonant frequency range of the combination of the speaker and the mass element falls within the range of frequencies;
   wherein the mass element produces a first haptic output from the audio information for vibrating the housing.

7. The apparatus of claim 6 wherein the docking interface includes a tray having a spring loaded extender for securing the housing to the portable electronic device.

8. The apparatus of claim 6, wherein the vibration unit outputs an audio output.

9. The apparatus of claim 6, wherein the vibration unit is an acousto-haptic device, and wherein producing the first haptic output comprises producing the first haptic output simultaneously with an audio output.

* * * * *